United States Patent [19]

Shortridge et al.

[11] Patent Number: 4,754,651
[45] Date of Patent: Jul. 5, 1988

[54] DIFFERENTIAL PRESSURE APPARATUS FOR MEASURING FLOW AND VELOCITY

[75] Inventors: Ernest R. Shortridge, Paradise Valley; J. Milton Smith, Jr., Mesa, both of Ariz.

[73] Assignee: Shortridge Instruments, Inc., Scottsdale, Ariz.

[21] Appl. No.: 853,753

[22] Filed: Apr. 18, 1986

[51] Int. Cl.[4] ............................................. G01F 1/34
[52] U.S. Cl. .................... 73/861.42; 73/4 R; 73/717; 73/861.65
[58] Field of Search ............ 73/861.42, 861.52, 861.62, 73/861.65, 861.66, 3, 42, 717

[56] References Cited

U.S. PATENT DOCUMENTS

| 3,509,767 | 5/1970 | Greer | 73/723 X |
| 3,924,612 | 12/1975 | Dempster et al. | 73/861.38 X |
| 4,030,358 | 6/1977 | Noll | 73/861.66 |
| 4,231,253 | 11/1980 | Ohnhaus et al. | 73/861.62 |
| 4,383,431 | 5/1983 | Gelneet | 73/4 R |
| 4,476,707 | 10/1984 | Burns et al. | 73/4 R |
| 4,570,493 | 2/1986 | Leemhuis | 73/861.62 |

Primary Examiner—Herbert Goldstein
Attorney, Agent, or Firm—H. Gordon Shields

[57] ABSTRACT

Apparatus measures airflow when used with a hood to control the flow of air through the hood. The apparatus measures air velocity when used with a pitot tube, a probe, or a grid. Differential pressure is measured, and absolute pressure is also measured. A temperature probe and a humidity probe are used to obtain temperature and humidity measurements, and the measurements are used to correct airflow and air velocity measurements for the effects of temperature, humidity, and absolute pressure. Back pressure is compensated for when the hood apparatus is used for airflow measurements by utilizing a pair of movable flaps that are mechanically inserted into and removed from the airflow. A differential pressure circuit includes a voltage controlled oscillator which is linearized over a specific operating range, and the specific operating range depends on the differential pressure being measured.

21 Claims, 6 Drawing Sheets

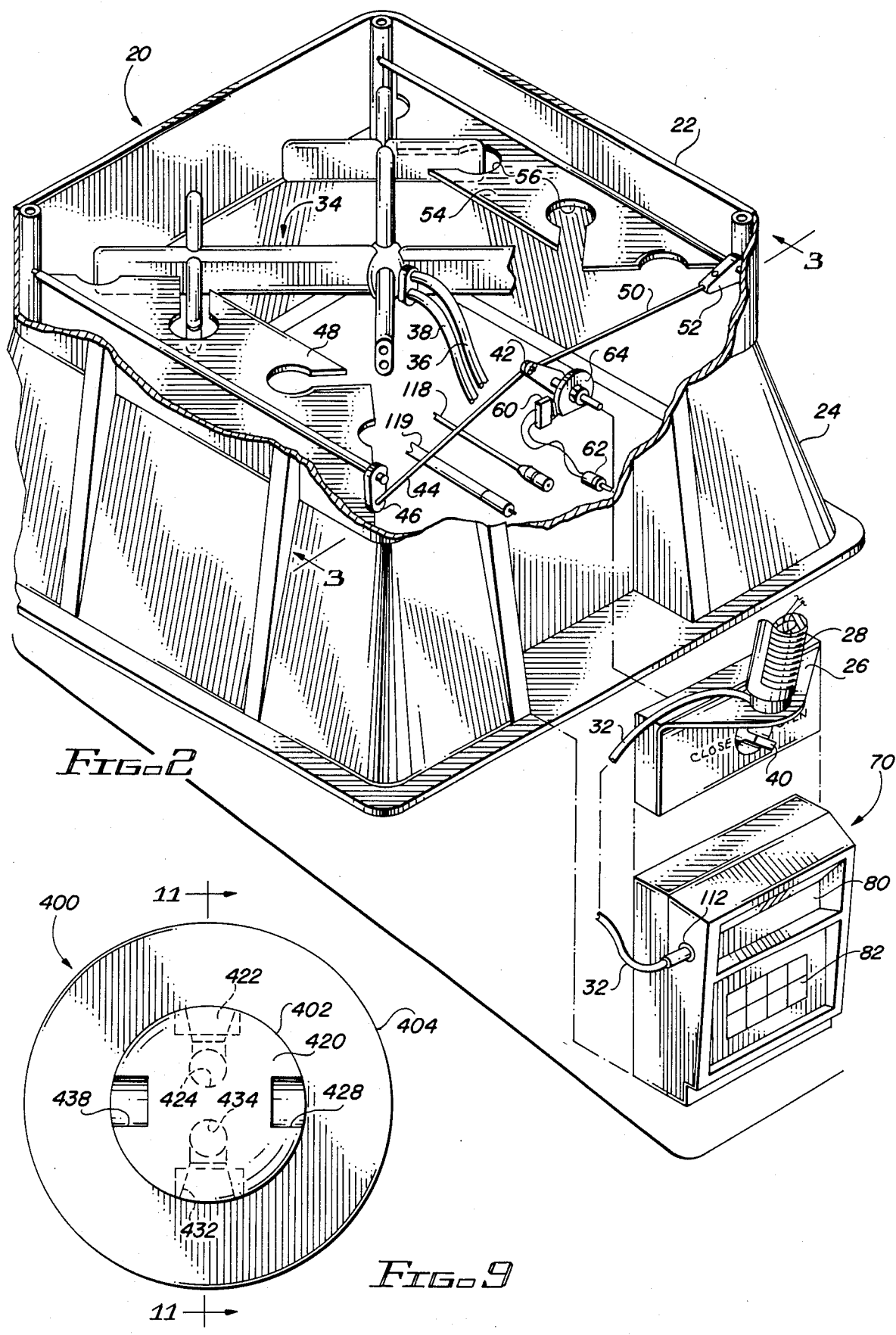

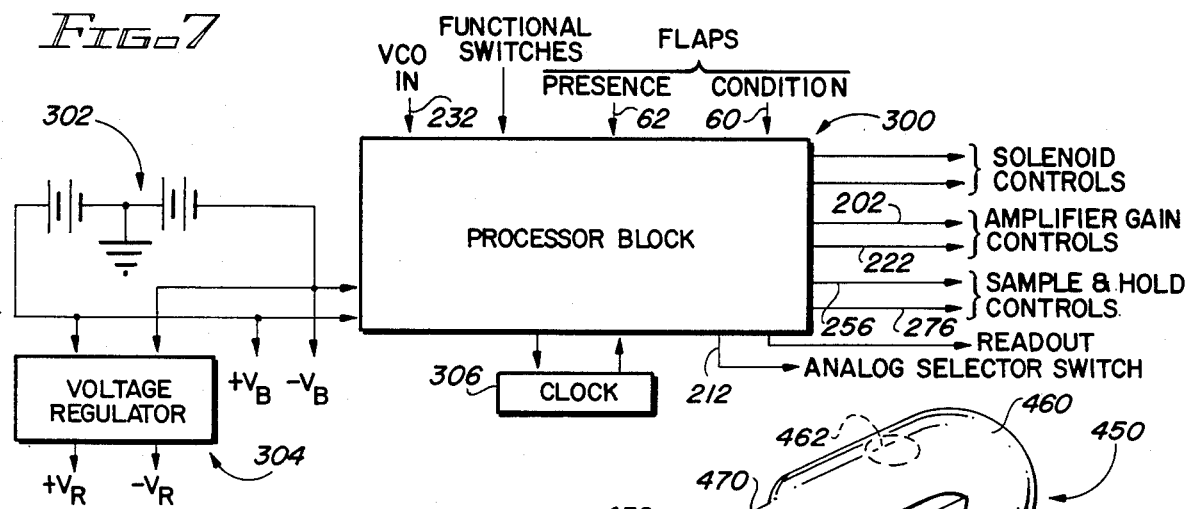

DIFFERENTIAL PRESSURE APPARATUS FOR MEASURING FLOW AND VELOCITY

BACKGROUND OF THE INVENTION

1. Field of the Invention

This invention relates to apparatus for measuring physical characteristics of air, and, more particularly, to apparatus for measuring the physical characteristics of air over a wide dynamic range and for automatically compensating the air measurements for back pressure, temperature, humidity, and barometric pressure.

2. Description of the Prior Art

U.S. Pat. No. 4,481,829, dated Nov. 13, 1984, discloses basic prior art apparatus, which includes a base frame and a hood securable to the base frame for measuring air flow for the purpose of balancing air flow systems. The U.S. Pat. No. 4,481,829 also discloses different types of pressure sensing grids disposed within the frame. Baffle systems are also disclosed for use with the pressure sensing grids to enable relatively low air flows to be measured.

The apparatus of the present invention may be considered as a second generation to the apparatus disclosed in the U.S. Pat. No. 4,481,829.

The advent of integrated circuits has encouraged the use of microprocessors for numerous control and calculating functions. Microprocessors are used in the apparatus of the present invention, along with other electronic elements and with mecahnical elements.

Prior art air measuring apparatus is generally limited in the data provided. For example, so far as is known, none of the prior art devices is able to provide back pressure compensation, and none is able to correct for air density. Moreover, none is able to measure relatively low air flows, and none is able to measure air flows over a relatively wide dynamic range. The apparatus of the present invention measures air flows from as low as about twenty-five or thirty feet per minute air velocity up to about twenty-five thousand feet per minute air velocity. The latter dynamic range represents a turndown range of about one thousand to one, or a range in terms of inches of water column from about 0.00004 inches to about fifty-eight inches.

The apparatus of the present invention overcomes the limitations of the prior art by automatically compensating for back pressure and for automatically correcting for air density. Accordingly, air measurement data are correct wherever the apparatus is used, whether at sea level, below sea level, or above sea level.

Relatively low air flows may be measured with a hot wire anemometer, but the same hot wire element may not also be used to measure relatively high air flows. Also, since a hot wire anemometer requires heat, the hot wire element interferes with its own environment by creating its own convection currents. These convection currents interfere with the flows being measured, particularly when the flows are relatively small. That is, the smaller the air flow being measured, the greater the interference with the air flow caused by the hot wire elements.

SUMMARY OF THE INVENTION

The invention described and claimed herein comprises apparatus for measuring air velocity, airflow, air temperature, air humidity, air differential pressure, and absolute pressure, and to automatically correct various air measurements for the effects of temperature, velocity, barometric pressure, and humidity, and the apparatus includes elements for sensing the temperature and humidity of air, and for sensing air pressure, and for converting the sensed data into the desired information. A grid for sensing total pressure and static pressure at a plurality of locations within a predetermined area is utilized, and flaps are inserted into the flowing air for providing information to compensate for the back pressure caused by the apparatus itself. The flaps are mechanically actuated. Microprocessors are used to process the sensed pressure to provide the desired information. A multifunction keyboard allows an operator to obtain selective information, and the desired information is visually displayed. Other air pressure sampling devices are used under various circumstances to provide input data for the microprocessors in order to provide other information.

Among the objects of the present invention are the following:

To provide new and useful air measurement apparatus;

To provide new and useful apparatus for measuring temperature, velocity, humidity, and pressure of air;

To provide new and useful apparatus for measuring airflow and for compensating the measurement for the effects of back pressure caused by the apparatus;

To provide new and useful apparatus for sensing air pressures and to compensate the air velocity and flow sensed for the effects of temperature, barometric pressure, and humidity;

To provide new and useful apparatus for sensing total air pressure and static air pressure;

To provide new and useful apparatus for measuring airflows over a relatively wide dynamic range;

To provide new and useful apparatus for measuring relatively low airflows;

To provide new and useful microprocessor controlled apparatus for providing information from sampled air pressures, temperatures, and air humidity;

To provide new and useful apparatus for compensating for variations in electrical components when using electrical components to provide airflow measurement information;

To provide new and useful apparatus for compensating air flow and air velocity measurements for the effects of barometric pressures;

To provide new and useful apparatus for compensating airflow and air velocity measurements for the effects of temperature; and To provide new and useful grid apparatus for compensating for the effects of back pressure in pressure sensing apparatus.

BRIEF DESCRIPTION OF THE DRAWING

FIG. 2 is a perspective view of a portion of the apparatus of FIG. 1.

FIG. 9 is a view of the apparatus of FIG. 8, taken generally along line 9—9 of FIG. 8.

FIG. 10 is a view in partial section taken generally along line 10—10 of FIG. 9.

DESCRIPTION OF THE PREFERRED EMBODIMENT

INTRODUCTION

The apparatus of the present invention comprises electronic micromanometer apparatus for providing information, digitally displayed, relating to the measurement of various characteristics of air. The term "air" is used throughout the specification. However, it will be understood that with modifications to software for the microprocessors used in the apparatus, the characteristics of virtually any gas may be measured. Indeed, some of the mechanical pressure sampling devices may be used also to sample the pressure of liquids, as well as the gaseous fluids for which the devices are primarily designed.

Several different pressure sensing or sampling devices are disclosed. With one device for measuring volume flows, air flows through a funnel apparatus and through a known cross-sectional area and past a grid manifold disposed in the funnel apparatus. Since the area of the funnel is known, the airflow in terms of cubic feet per minute may be provided. The back pressure caused by the funnel apparatus itself is automatically compensated for. Also, by sensing the absolute pressure of the air and the temperature of the air, the airflow may be corrected for air density. If desired, the humidity of the air may also be sensed to provide an additional correction factor.

With other pressure sampling devices, not including area restrictions, air velocity is measured. Two such devices are described in detail. One such device is sometimes referred to as a "velprobe" or merely as a probe. The probe includes an elongated wand-like element disposed in an airflow.

Another device is sometimes referred to as a "velgrid" sampling device. The velgrid device incldues a grid manifold secured to an elongated handle. The grid manifold is substantially identical to the grid manifold used in the funnel apparatus and it accordingly samples air pressure at a plurality of locations and provides an average differential pressure. The apparatus may be used, for example, to sample air pressures at the face of a filter or merely at a plurality of locations in a room.

Other air sampling devices, such as the well known pitot tube, may also be used with the apparatus of the present invention.

AIRFLOW SAMPLING APPARATUS

Figure 1:
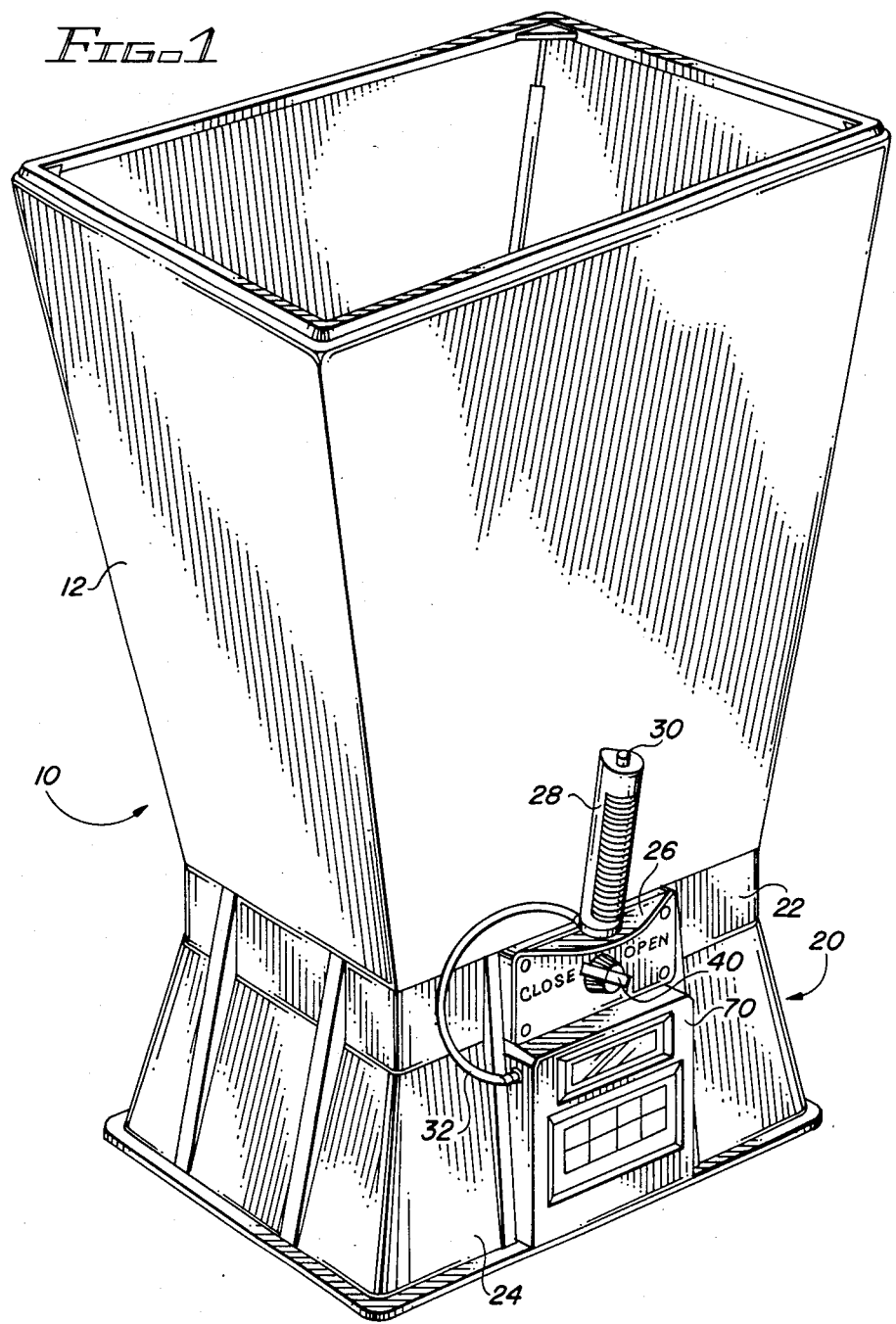
FIG. 1 is a perspective view of apparatus including the present invention.

FIG. 1 is a perspective view of airflow sampling apparatus 10 incorporating the apparatus of the present invention, and comprising a use environment, or one of its use environments, of the apparatus of the present invention.

In FIG. 1, airflow sampling or air balancing apparatus 10, used generally for balancing the flow of air in ductwork, is illustrated. A funnel 12 is secured to a base 20. The funnel 12 is preferably made of relatively close or tightly woven material so as to substantially eliminate the leakage of air through the material and so that the airflow is directed to the funnel 12, and through the base 20. The funnel is appropriately supported by structural elements, as required. The cross section of the funnel 12 is generally rectangular. Air flowing through the apparatus 10 flows through a known cross sectional area and accordingly airflow information may be provided.

The base 20 includes two portions, a generally rectangular upper portion 22 and a generally truncated pyramidally configured lower portion 24. The base 20 may be made of appropriate plastic or polymer material.

Secured to the front of the base 20 is a flap control housing and plate 26. Extending outwardly from the upper portion of the plate 26 is a flange which supports a handle 28. The handle 28 includes an electrical switch 30. The switch 30 is connected to an electrical cable 32 which in turn extends to a meter 70. The function of the thumb switch 30, the cable 32, and the meter 70 will be discussed in more detail below. The meter 70 and the housing and bracket plate 26 are shown spaced apart from the base 20 in FIG. 2.

A flap selector knob 40 extends outwardly from the control housing secured to the bracket plate 26. The flap selector knob 40 is used in conjunction with a pair of flaps shown in FIGS. 2 and 3 and discussed in detail therein.

FIG. 2 is a perspective view of the base 20, showing various elements associated with the apparatus of the present invention and disposed within the base 20. The hood 12 has been removed from the base 20, as shown in FIG. 2, for the convenience of the elements within the base 20.

Appropriately supported within the upper portion 22 of the base 20 is a manifold 34. The manifold 34 is disclosed in detail in U.S. Pat. No. 4,481,829, referred to and briefly discussed above.

A pair of flexible tubes or conduits, either plastic or rubber or the like, extend from the manifold 34 to the back of the meter housing 70. The conduits include an upper (total pressure) conduit 36 and a lower (static pressure) conduit 38. The conduits 16 and 38 will be discussed in more detail in conjunction with FIGS. 5 and 6. In actuality, the apparatus of the present invention will operate regardless of the direction of airflow, and accordingly the conduits 36 and 38 are referred to as total pressure and static pressure conduits primarily for convenience. Again, this will be discussed in detail below.

A pair of flaps 48 and 54 are appropriately journaled for rotation on the base 20. The flaps 48 and 54 are disposed within the upper portion 22 of the housing 20, and are journaled for rotation on oppositely disposed walls or sides of the upper portion 22. The flaps 48 and 54 are shown in their closed position in FIG. 2.

It will be noted that, in their closed positions, the flaps 48 and 54 extend into the base 22, substantially perpendicularly to the walls of the upper portion 22 of the base 20. In such a position, they block a portion of the air flow through the base 22. The area of the flaps 48 and 54 is known, and the area of the base 22 is also known. Accordingly, the percentage of the total area of the base 22 which the flaps 48 and 54 occupy or block, in their closed position, can be calculated. The effect of not only the flaps 48 and 54, but also the effect of the apparatus 10, may be appropriately determined for any airflow to which the apparatus 10 is applied.

Figure 3:
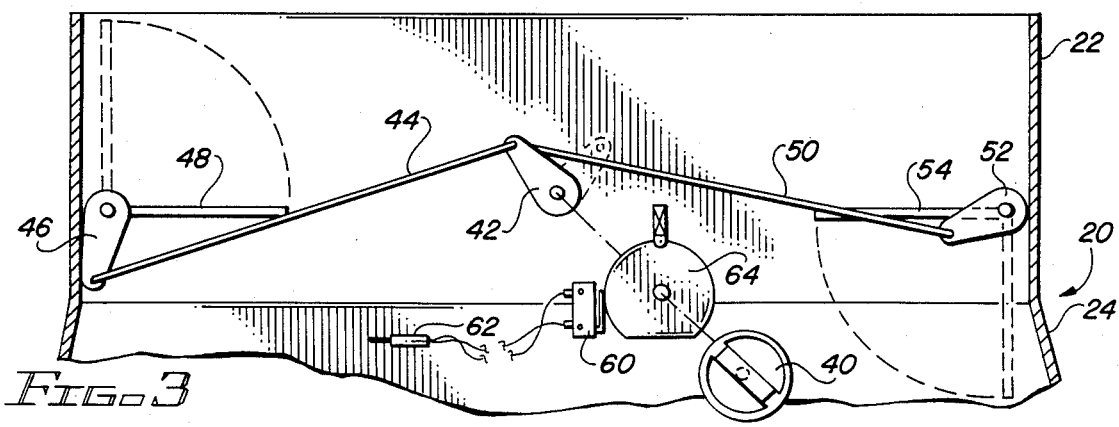
FIG. 3 is a view of a portion of the apparatus of FIG. 2, taken generally along line 3—3 of FIG. 2.

FIG. 3 is a semi-schematic representation taken generally along line 3—3 of FIG. 2, illustrating the opening and closing of the flps 48 and 54 by means of mechanical linkage through the flap selector control knob 40.

In FIG. 2, part of the upper portion 22 of the base 20 has been broken away to show the linkage for actuating the flaps 48 and 54. In FIG. 3, the linkage is shown in detail. The knob 40, mounted on the bracket plate 26, is mechanically connected to a link 42. The connection between the knob 40 and the link 42 is schematically illustrated. The link 42 is appropriately secured for a pivoting movement on the base 20, and specifically to the front wall of the upper portion of the base 20.

A pair of rods 44 and 50 are in turn connected to the link 42 and extend outwardly therefrom. The rods 44 and 50 are connected to the link 42 remote from the pivot point of the link. the link 42 pivots about a point on its lower end, and the rods 44 and 50 are accordingly appropriately secured to the upper end of the link.

The end of the rod 44 remote from the link 42 is secured to an arm 46 of the flap 48. The arm 46 extends downwardly from the flap 48, as shown in FIG. 3, substantially perpendicularly to the flap 48. The arm 46 is secured to the flap 48 about the pivot point or pivoting access of the flap 48. As indicated before, the flap 48 is appropriately secured for pivoting motion or movement on the upper portion 22 of the base 20.

The rod 50 extends from the link 42 to an arm 52. The arm 52 is secured to the flap 54 on the pivot axis of the flap 54. There is an angular displacement between the arm 52 and the flap 54, but it is, as shown in FIG. 3, substantially less than the angular orientation between the arm 46 and the flap 48.

As shown in FIGS. 2 and 3, the flaps 48 and 54 are in their closed position, in which they are disposed substantially horizontally and aligned with each other. They stand, as indicated, substantially perpencidularly to the air flowing through the apparatus 10, and by the manifold 34 within the base 20. When the switch 40 is rotated approximately ninety degrees or so clockwise, as shown in FIGS. 2 and 3, the link 42 pivots through the same angular distance. The pivoting of the link 42 causes a movement of the rods 44 and 50 and there is a corresponding pivoting movement of the arms 46 and its flap 48 and the arm 52 and its flap 54.

It will be noted that, with the clockwise pivoting of the link 42, there is a counterclockwise pivoting of the arm 46 and the flap 48 to the position shown in phantom in FIG. 3. At the same time, there is a counterclockwise pivoting of the arm 52 and its flap 54, also to the position shown in pahntom in FIG. 3. Thus, in the open position of the flaps 48 and 44, the flap 48 extends upwardly from its pivot point and the flap 54 extends downwardly from its pivot point.

In the open position of the flaps 48 and 54, the flaps 48 and 54 are disposed substantially parallel to their adjacent walls, prsenting minimum frontal surface area of the flow of air to the base 20 and accordingly having minimum interference effect on the airflow. In the open position, the flap 48 extends upwardly and the flap 54 extends downwardly. The flaps 48 and 54 are parallel to each other, but they extend in opposite directions to offset any effects of their presence in the air stream in their open position with respect to reversal of flow direction.

From FIG. 2, it will be noted that the configuration of the flaps is not regular. There are cutout portions to accommodate the arm members of the manifold 34 to which the flaps are adjacent. The flaps are preferably disposed, in their closed, or horizontal, position, about in the middle of the manifold 34, horizontally speraking. That is, the flaps are in substantially the same plane as the manifold and about at the midpoint between the top and bottom of the manifold.

The apparatus 10, and the effect of the flaps 48 and 54, may be calibrated by using known airflows. By placing the apparatus 10 in known airflows, and by measuring the pressure drop across the apparatus at the known airflows with the flaps open and with the flaps closed, it has been determined that there is a repeatable flow resistance ratio which may be attributed to the presence of the apparatus 10 on the airflow and to the open or closed condition or status of the flaps. That is, the ratio of the pressure drops with the flaps open and the flaps closed provides a repeatable flow resistance ratio. Accordingly, the repeatable flow resistance ratio may be applied to airflows measured with the flaps open and with the flaps closed to compensate or correct airflow readings for the back pressure due to the presence of the apparatus 10. The predetermined correction factor calculations are programmed into the data processor and are used when the back pressure compensated flow measurements are desired.

It will be noted that when flow measurements are desired, the apparatus 10 must be used. In order to insure that flow measurements are only provided when the meter 70 is connected to the apparatus 10, a flap connector cable 62 extends from an electrical switch 60 to the meter 70. The electrical switch 60 is actuated by an actuator cam 64 connected to the linkage between the actuator knob 40 and the link 42.

The presence of the flaps is indicated to the meter when the cable 62 is plugged into the meter 70. The position of the flaps either open or closed, is indicated by the open or closed position or condition of the electrical switch 60.

The actuator cam 64 preferably includes a pair of detents and a spring-loaded detent element to insure that the flaps are actuated to the fully open or fully closed position. The detents provide a positive indication to the user of the apparatus 10 of the fully open and fully closed positions of the flaps 48 and 54.

Referring again to FIG. 2, a temperature probe 118 is shown extending outwardly from the rear of the meter 70. Adjacent to the temperature probe 70 is a humidity probe 119. The probes 118 and 119 may be combined into a single probe, if desired.

The temperature probe and the humidity probe are used to sense the temperature and humidity of the sampled air for display and also to correct flow and velocity for air density.

It will be noted, as shown in FIG. 2, that the flaps 48 and 54 include a number of cutout portions 56. When the flaps are in the closed (horizontal) position, the cutout portions 56 are disposed adjacent to arms or arm elements of the pressure sampling manifold 34. The cutout portions 56 allow the air to flow relatively unrestricted past the manifold grid 34 so as not to interfere with the pressure sampling function of the grid 34. A relatively linear flow of air is accordingly maintained over the grid manifold 34. The cutouts 56 help to prevent a horizontal flow of air in the area of the pressure sampling orifices in the arms or arm elements of the manifold 34 which could cause erroneous pressure measurement data.

DATA PROCESSING

Figure 4:
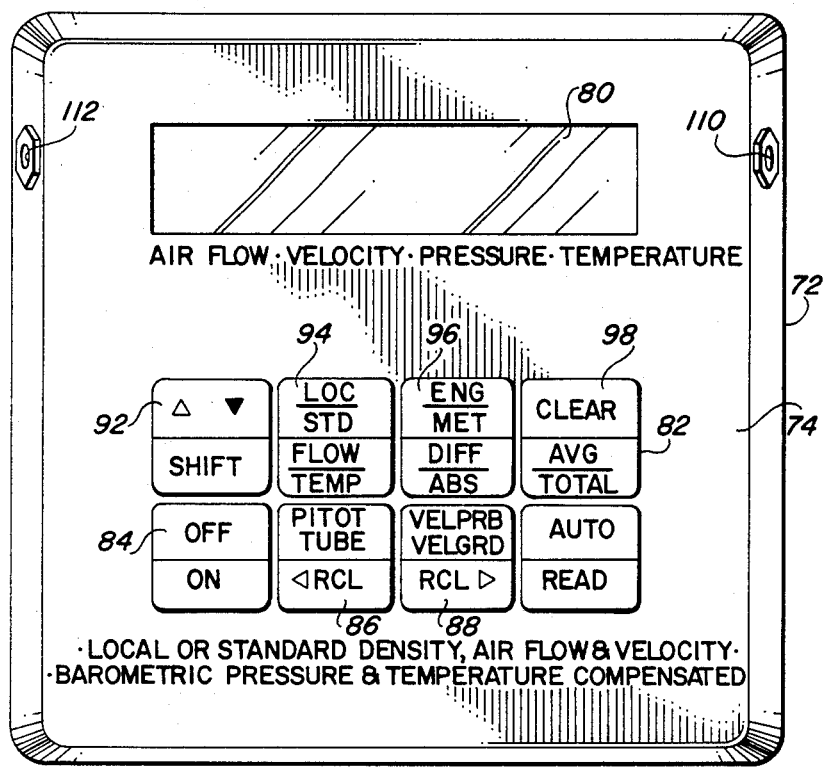
FIG. 4 is an enlarged front view of a portion of the apparatus of the present invention.

FIG. 4 is an enlarged front view of the meter 70. It will be noted that the term "meter" as used herein is a generic or collective term referring to the unit which contains the data processing functions and the elements associated therewith. Within the meter housing are included microprocessors and circuitry for performing the various arithmetic computations required. Also within the housing are environmental sensing transducers, sensors, and amplifier circuits. For convenience hereafter, the term "microprocessor" will be used to collectively designate the logic and information processing elements.

The meter 70 is removable from the base 20 and may be handheld for certain applications. These will also be discussed in detail below in conjunction with various other pressure sampling elements of the apparatus of the present invention.

The meter 70 includes two housing portions, a front housing portion 72 and a rear housing portion 76. The meter housing portions 72 and 76 comprise a housing separable or removable from the base 20, as mentioned above and as will be discussed below in conjunction with other pressure sensing elements. The front housing portion 72 includes a front panel 74. At the top or upper portion of the front panel 72 is a display panel 80 which includes a plurality of segments for providing a digital visual readout. Such digital readout displays are well known and understood. The visual readout provided is in terms of instructions and specific data, all in accordance with the programmed features of the microprocessor and in accordance with the instructions provided by the user through a plurality of switches. The switches are found on a function switch panel 82, below the display panel 80.

Eight switches are illustrated. The switches each include at least two functions, referred to for convenience as an upper function and a lower function. In some cases, there are two secondary functions, again upper and lower functions, for the primary upper and lower functions. The eight switches are found in two rows, an upper row and a bottom or lower row, each including four switches. From the bottom left, there is an off/on switch 84, a pitot tube/left (reverse or descending order) recall switch 86, a velprobe-velgrid/right (forward or ascending) recall switch 88, and an automatic/read switch 90. The upper four switches include an upper/lower shift switch 92, a local-standard/flow-temperature switch 94, an English-metric/differential-absolute switch 96, and a clear/average-total switch 98. It will be noted that each switch includes at least two functions, and to differentiate the two functions, the upper half of each switch is light with dark lettering, and the lower half of each switch is dark with light lettering. In other words, the lettering and background of the top and bottom of each switch is different so that the dual functions of each switch may be clearly delineated.

Assuming the apparatus is in its "off" state, pushing or actuating the switch 84 will turn the meter on. Pushing the switch again will turn the meter off. When the meter is first turned on, the bottom functions are automatically provided. However, local density conditions and English units are automatically provided at start. The purpose of each of the switches 84 . . . 98 is to allow a user to select the various modes and functions as desired and to initiate measurements and readings for display.

The shift switch 92 must be pressed to select the upper functions. When in the lower mode, the functions for the switches 94, 96, and 98 automatically alternate. That is, in the lower switch mode, pressing the switch 96 will cause the differential pressure mode to be selected. Pushing the switch 96 a second time will cause the absolute pressure mode to be selected.

To change to the upper key functions, the shift key or switch 92 must be pressed. After the shift switch 92 is pressed, the upper functions are selectable. However, after a single upper function is selected, the meter 70 automatically shifts back to the lower mode. Accordingly, if the alternate functions of an upper key mode are desired, the shift key 92 must be pressed again after selecting the previous function.

Figure 5:
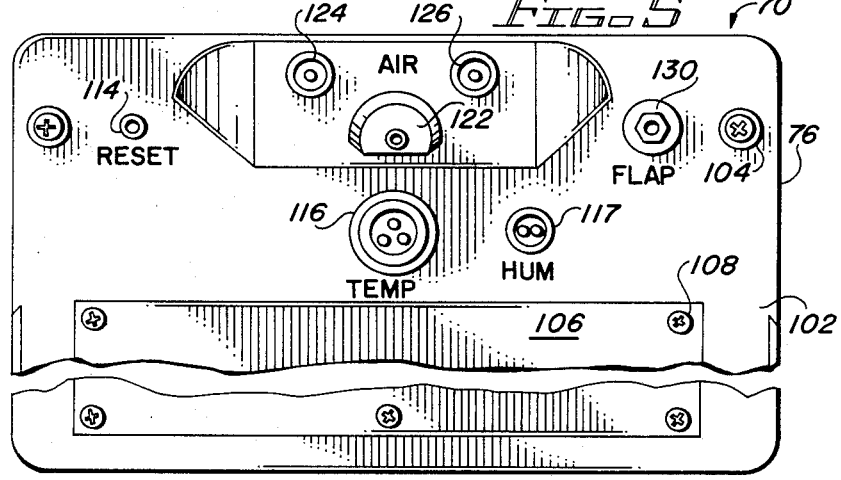
FIG. 5 is an enlarged rear view of the apparatus of FIG. 4.

FIG. 5 is a rear view of the meter 70. The meter 70 is removable from the base 20, as indicated above, for use with various pressure sampling devices, as will be discussed below. The meter 70 includes a rear housing portion 76 which is appropriately secured to the front housing portion by a plurality of fastening elements 104, such as screws. The rear housing portion 76 includes a rear panel 102. The fastening elements 104 extend through the rear panel 102. The rear panel 102 also includes an interior access panel 106. The access panel 106 is appropriately secured to the housing 76 by a plurality of appropriate fastening elements 108, which may also be screws. By removing the interior access panel 106, the interior of the meter 70 is accessible for purposes of replacing batteries.

On the side of the meter 70 are two jacks, a battery charger jack 110 on one side, and an external read jack 112 on the opposite side. A battery charger may be plugged into the jack 110 to recharge batteries within the meter housing.

As best shown in FIG. 1, the cable 32, connected to the thumb switch 30 of the handle 28, plugs into the jack 102. Depressing or actuating the switch 30 allows a user to take a reading, or a number of readings, without having to actuate the read switch 90 on the front of the function switch panel 82.

A reset switch 114 is disposed within the housing portion 76, and is accessible through an opening in the back panel 102. The purpose of the reset switch 114 is to allow the circuits within the meter housing to be reset in case of accident, memory loss, etc.

Extending outwardly from the rear panel 102 of the housing portion 76 is a temperature probe jack 116. The temperature probe jack 116 receives or is connected to a temperature probe 118, shown in FIG. 2. The temperature probe 118 extends inwardly from the meter 70 into the interior of the housing 20 for sensing the temperature of the airflow within the base 20. The temperature information from the probe 118 is used by the circuitry, under the control of the microprocessor, for providing corrected data, as will be discussed below.

A humidity probe jack 117 is spaced apart from the temperature probe jack. If desired, both temperature and humidity sensing may be combined, and only a single jack may then be required.

At the upper portion of the meter 70 is a recessed area 120. Extending outwardly from the lower portion of the recessed area is a screw jack boss 122. The purpose of the screw jack boss 122 is to receive a screw element to secure the meter 70 to the base 20. A screw fastener, not shown, extends through the upper portion 22 of the housing 20, and extends into the screw jack portion of the boss 122.

Also extending outwardly from within the recessed area 120 is a pair of pressure ports, including a positive pressure port 124 and a negative pressure port 126. The positive pressure port 124 and the negative pressure port 126 connect, respectively, with the conduits or tubes 36 and 38 from the manifold 34. The pressure port 124, labeled "+" connects with the tube or hose 36. The hose 36 is in turn connected to the upper or upstream portion of the manifold 34, and accordingly receives total pressure of the air flowing downwardly through the hood apparatus 10, as shown in FIGS. 1 and 2. The port 126, labeled "−" is connected to the tube or hose 38. The tube or hose 38 is in turn connected to the lower or downstream portion of the manifold 34, and accordingly senses the static pressure of the air flowing through the apparatus 10.

It will be noted that the term "static" pressure, as used throughout the specification and claims, often refers to leeside pressure, instead of true static pressure. However, the difference between true static pressure and leeside pressure is corrected for, or is compensated for, in the microprocessors by appropriate calculations. Accordingly, the term "static pressure" is used throughout the specification and claims with virtual impunity.

The apparatus of the present invention measures airflow in two directions and it is thus important how the pressure sensing elements are connected to the meter 70. In order to maintain correct or consistent arithmetic sign values and correct effective area factors, the total pressure must be connected to the port 124, and the static pressure must be connected to the port 126.

A flaps jack 130 is also located on the back of the housing portion 102. Unless the flap cable 62 is connected to the jack 130, volume airflow data may not be provided.

Figure 6:
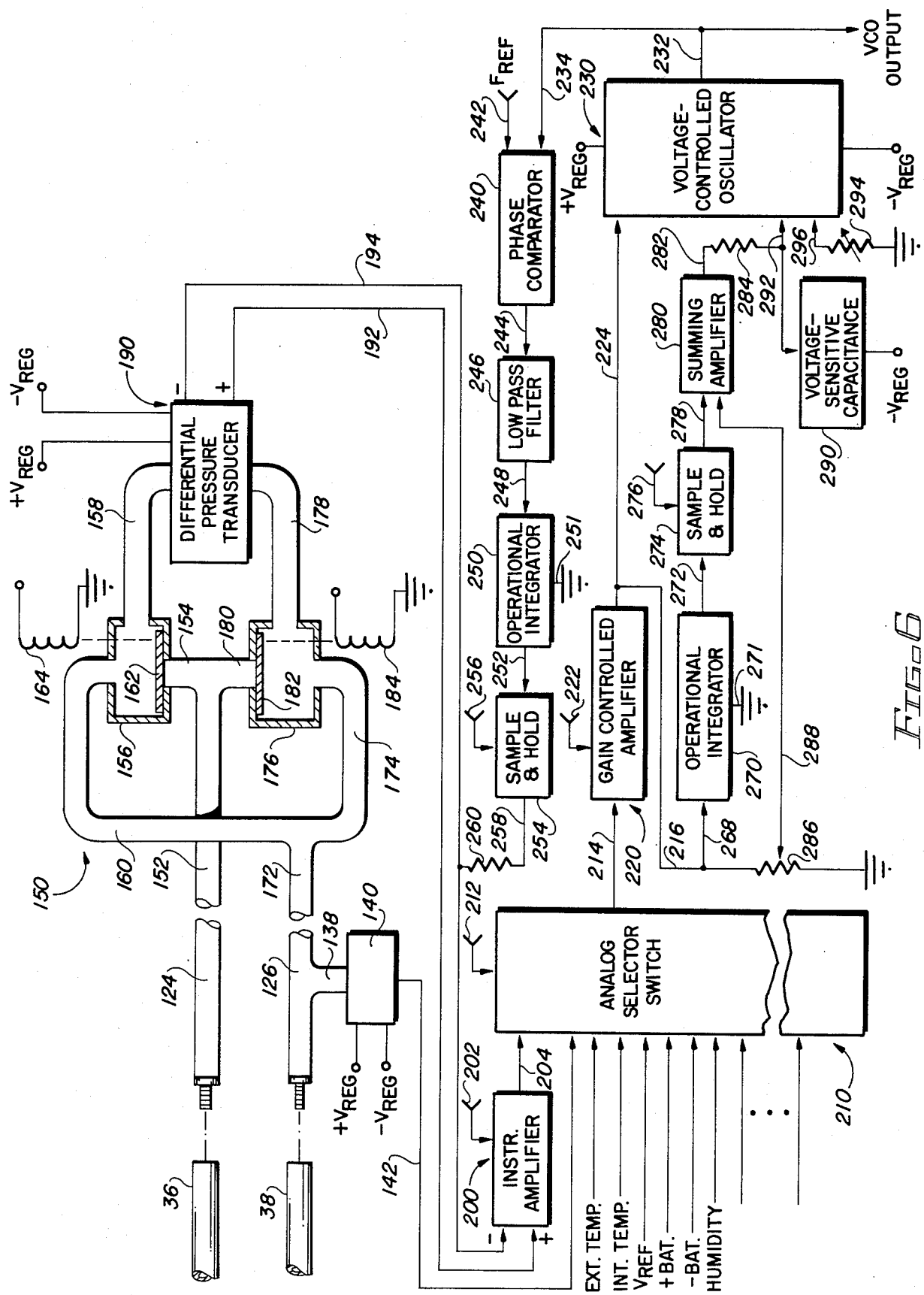
FIG. 6 is a schematic circuit diagram of a portion of the apparatus of the present invention.

FIG. 6 is a schematic diagram of the pressure transducing elements and the associated circuitry of the apparatus of the present invention. The elements illustrated in FIG. 6 are disposed within the meter housing. The pressure ports 124 and 126 are illustrated, and the conduits or tubes 36 and 38 are shown adjacent to the ports 124 and 126, respectively.

The ports 124 and 126 are connected to a solenoid controlled valve system 150. The valve system 150 is in turn connected to a differential pressure transducer 190. The pressure transducer transduces the pressure differential from the manifold 34, or from other pressure sensing or sampling elements, as discussed above, and as will be discussed in detail below, to an electrical output signal in the form of a voltage proportional to the pressure differential. The electrical output signal is appropriately processed to provide digital information displayed on the display panel 80.

The port 124 is connected to a conduit 152. The conduit 152 extends to a pair of branch conduits 154 and 180. The branch conduit 180 extends to a valve body or cylinder 156. Two other conduits are also connected to the valve cylinder 156. A conduit 158 extends from the cylinder 156 to the differential pressure transducer 190, and a conduit 160 extends from the valve cylinder 156 to a conduit 172. The conduit 172 is connected to the port 126.

Within the valve body or cylinder 156 is a movable valve element 162. The valve element 162 is controlled by a solenoid 164. As shown in FIG. 6, the solenoid 164 is in its normally closed position, with the valve element 162 blocking or closing the conduit 154 to prevent communication between the cylinder 156, and, ultimately, the hose or tube 36.

The conduit 172, in addition to being connected to the conduit branch 160, is also connected to a conduit branch 174. The conduit 174 extends to a second valve body or cylinder 176. The valve body or cylinder 176 is connected to two other conduits or conduit branches, including a conduit branch 178 and a conduit branch 180. The conduit branch 178 extends to the differential pressure transducer 190, and the conduit branch 180 extends to the conduit 152.

Within the valve body or cylinder 176 is a valve element 182. The valve element 182 is controlled by a solenoid 184. With the solenoid 184 is its normally off or closed position, the valve element 182 blocks the conduit 180 to prevent communication between the cylinder 176, and, ultimately, the port 124.

In the normally closed or off position of both solenoids, the respective valve elements 162 and 182 block the pressure from the tube 36, the port 124, and the conduit 152. The differential pressure transducer 190 accordingly communicates with static pressure from the tubing 38 through the port 126, the conduit 172, and the conduits 160 and 174 to the valves 156 and 176, respectively, and from the valves 156 and 176, respectively, through the conduits 158 and 178. The only pressure in the cylinders 156 and 176 is static pressure, and therefore only static pressure is transmitted to both sides of the differential pressure transducer 190. Any output from the differential pressure transducer under these circumstances represents a zero pressure differential output.

The differential pressure transducer 190 is appropriately connected to a regulated voltage supply. The voltage inputs to the differential pressure transducer 190 are, of course, important since the output from the differential pressure transducer is affected by the input voltage and is the basis for the ultimate information provided by the apparatus of the present invention.

With both solenoids 164 and 184 in their off, normally closed, positions or states, the valve elements 162 and 182 prevent any communication from the upstream or total pressure portion of any pressure sampling device to which the meter apparatus 70, through the ports 124 and 126, is connected. Accordingly, with the solenoids 164 and 184 in their off position, static pressure only through the port 126 and the conduits 172, 160, and 174, is communicated through the valves 156 and 176 to opposite sides of the differential pressure transducer 190. With only static pressure on both sides of the transducer 190, a zero reading is obtained. Any output from the transducer under such circumstances is considered a zero reference output or signal. At the beginning of each reading for the meter 70, the zero reading, or zero differential pressure output from the differential pressure transducer is the starting point. Then, the solenoids 164 and 184 are alternately actuated so that positive pressure and static pressure are alternately impressed upon both sides of the differential pressure transducer 190. This procedure results in effectively doubling of the output of the differential pressure transducer since one pressure reading will go in one direction above the zero reading, and the reverse pressure reading will go below the zero reading in the same amount.

For a reading, after the static or off position of the solenoids 164 and 184, as discussed above, the solenoid 164 is first actuated, causing the valve actuator 162 to move from the position shown in FIG. 6, where it blocks the conduit 154, to a position in which it blocks the conduit 160. The higher total pressure from the positive pressure boss 124, through the conduit 152 and the conduit 154 is then communicated to the cylinder 156. From the cylinder 156 the pressure is communicated to the differential pressure transducer 190 through the conduit 158. At the same time, static pressure remains on the opposite side of the differential pressure transducer 190. An appropriate output voltage, proportional to the differential pressure sensed by the transducer 190, is then transmitted on a pair of conductors 192 and 194 to an instrument amplifier 200.

When the reading of the differential pressure has been taken with the solenoid 164 actuated, the solenoid 164 is turned off, causing the valve actuator 162 to move to its closed position, closing off the conduit 154. The solenoid 184 is then actuated, causing the valve actuator 184 to open the conduit 180 to the cylinder 176, and closing the conduit 174. In this state, with the solenoid 184 on and the solenoid 164 off, there is a reversal of the pressure across the differential pressure transducer 190. Now, static pressure from the port 126 is communicated to the cylinder 156 through the conduits 172 and 160. The pressure in the cylinder 156 is then communicated to the conduit 158 to one side of the differential pressure transducer 190. At the same time, high pressure through the port 124 is communicated through the conduits 152 and 180 to the valve body or cylinder 176. From the valve body or cylinder 176, the high pressure is then transmitted to the opposite side of the differential pressure transducer 190 through the conduit 178.

This reversal of the high pressure and static pressure across the differential pressure transducer 190 provides a second output from the differential pressure transducer representing the pressure differential reversed from the differential pressure sensed when the solenoid 164 was actuated and the solenoid 184 was off. Accordingly, the amplitude of the output signal or voltage from the differential pressure transducer 190 will be in the opposite sense, but with an amplitude approximately equal in magnitude to the first output signal, with the zero condition output from the pressure transducer taken as the reference point for zero drife compensation. This will be discussed below.

As discussed above, the pressure differential across the transducer 190 is relatively small, and thus the output signal of interest on the conductors 192 and 194 is also relatively small. The output level of the signal of interest of the transducer 190 is so low that a relatively large amplification factor is required to produce an adequate electrical signal that may be used in a meaningful manner. The solenoids 164 and 184 are alternately actuated so that both total and static pressure are alternately introduced on opposite sides of the differential pressure transducer 190 so that a maximum pressure differential may be provided by the transducer 190 as an indication of the pressure differential being measured.

The solenoids 164 and 184 are controlled by appropriate signals from the microprocessor. The alternating actuation of the solenoids 164 and 184 is accomplished in a predetermined manner so that a plurality of cycles of pressure are sensed in a predetermined time period. This provides an average pressure differential over a period of time as, for example, several seconds for each particular reading. The average values of the pressure differentials are then appropriately calculated by the microprocessor in response to appropriate information or signals from the circuitry involved in FIG. 6 and also as shown in FIG. 7.

Figure 7:
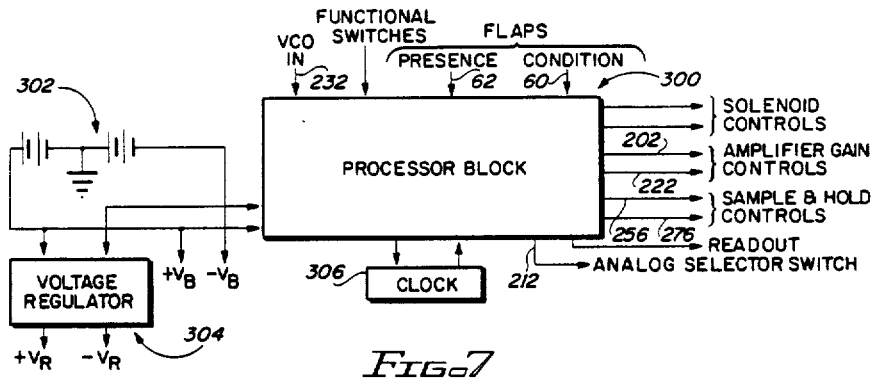
FIG. 7 is a schematic broken diagram of a portion of the apparatus of the present invention.

FIG. 7 is a block diagram illustrating the general control of the data processing involved in the present invention. In FIG. 7 is shown a processor block 300. The processor block 300 includes the plurality of microprocessors, as required for controlling the various functions involved in the apparatus of the present invention. Included in the processor block also is appropriate memory in which data are stored. The stored data include information pertaining to the various readings, such as discussed above in conjunction with the solenoid controlled valves 150 and the differential pressure transducer 190.

Power for the apparatus of the present invention is provided by a center tapped battery 302. The battery, as briefly mentioned above, is appropriately rechargeable.

In addition to utilizing battery voltage, the apparatus of the present invention also includes a voltage regulator 304 which provides carefully regulated voltage. The regulated voltage has also been referred to briefly above in conjunction with the differential pressure transducer 190. Other circuit elements illustrated in FIG. 6 require regulated voltage and battery voltage, as is well known and understood in the art.

Timing or clock functions are provided by an appropriate clock element 306, which may be a crystal controlled oscillator or the like.

In addition to the voltage inputs and clock inputs to the processor block 300, there are several other inputs illustrated in FIG. 7, and discussed above. For example, there are functional switches which are appropriately connected to the processor block. In addition, the presence and condition of the flaps, when the meter apparatus 70 is utilized with the air volume pressure sensing apparatus, also comprises inputs to the processor block.

Output signals from the processor block include signals for actuating the solenoids 164 and 184, sample and hold control signals, readout controls, and amplifier gain control signals. Also, there are appropriate readout signals transmitted from the processor block 300 to the readout panel 80, as discussed above.

Referring again to FIG. 6, a conduit 138 extends from the static pressure port 126 to an absolute pressure transducer 140. The absolute pressure transducer 140 provides an output representative of the absolute pressure sensed or sampled by the pressure sampling devices discussed herein. An output signal, or voltage, representative of the magnitude of the absolute pressure, is transmitted on conductor 142. Like the differential pressure transducer 190, the absolute pressure transducer 140 is provided with a regulated voltage supply.

The instrument amplifier 200 is a gain controlled instrument amplifier with an input conductor 202 from the processor block 300. The processor block 300 determines the amount of gain which the amplifier 200 provides for the signal from the differential amplifier 190.

The instrument amplifier 200 provides its output on a conductor 204 to an analog selector switch 210. The conductor 142 from the absolute pressure transducer 140 also extends to the analog selector switch 210. A number of other input conductors are shown extending to the analog selector switch 210. They include an external temperature input, which originates with the temperature probe 118, shown in FIG. 2, and discussed also in conjunction with FIG. 6.

An internal temperature input is also provided to the analog selector switch 210. The internal temperature input is taken by a temperature sensing element, not shown, disposed within the meter 70. The temperature of the components within the meter 70 is utilized by the processor block 300 in making its appropriate calculations. Since the electrical properties of various circuits and circuit elements varies with temperature, in order to provide an accurate readout, the temperature of the various circuits and circuit elements is important.

Reference voltage is also an appropriate input to the analog selector switch 210, as is the battery voltage. From the humidity probe 119, shown in FIG. 2, an input signal representing the humidity of the air being sampled is also on input to the analog selector switch 210. Other input data may also be transmitted to the analog selector switch, depending on the desires of the user or the requirements of the processor 300.

The analog selector switch 210 is controlled by an input signal from the processor block 300 on conductor 212. The signal on conductor 212 selects the appropriate input signal from the analog selector switch 210 to be transmitted through the other circuit elements illustrated in FIG. 6.

From the analog selector switch 210, a signal is transmitted on conductor 214 to a gain controlled amplifier 220. The gain of the amplifier 220 is controlled by the processor on a signal from conductor 222. The amplified signal from the gain controlled amplifier 220 is transmitted on conductor 224 to a voltage controlled oscillator 230, where it is used to help tune or control the frequency of the oscillator 230.

From the voltage controlled oscillator 230, an output signal is transmitted on a conductor 232 to the processor block 300. In addition, the output signal from the voltage controlled oscillator 230 is transmitted from conductor 232 on a conductor 234 to a phase comparator 240. For convenience, the term "voltage controlled oscillator" may hereinafter be shortened to only "VCO".

The VCO 230 has three input ports, a voltage sensitive input port, a capacitance sensitive port, and a resistance sensitive port. Inputs to all three input ports affect the frequency output of the VCO. The conductor 224 is connected to the voltage sensitive input port. The output of the VCO 230 is a frequency generated in response to the input voltage on conductor 224 and as affected by inputs to the capacitance and resistance sensitive ports.

The phase comparator 240 includes two inputs, one of which is the voltage controlled oscillator output on conductor 234 and the second is a reference frequency input from the processor block 300 on conductor 242. The reference frequency is compared to the frequency input from the VCO on the conductor 232 by the phase comparator 240. In turn, the phase comparator 240 transmits an output on conductor 244 to low pass filter 246. The output from the filter 246 is then transmitted on conductor 248 to an operational integrator 250.

Two frequencies are inputs to the phase comparator 240. A frequency from the VCO 230 on conductor 234 and a reference frequency from the processor 300 on conductor 242. The output of the phase comparator 240 is a voltage responsive to the difference in phase between the two input frequencies. The low pass filter 246 takes the higher frequency components out of the output from the phase comparator 240.

The integrator 250 uses ground on conductor 251 from the center tap of the battery 302 as its reference in controlling its integrating action. The integrated signal, referenced to ground, is then transmitted on conductor 252 to a first sample and hold circuit 254. The operational integrator integrates the voltage from the low pass filter 246 with respect to ground voltage, and can go from about −4 volts to about +4 volts. Its output is the voltage required to bring the input voltage to the ground reference voltage.

The operational integrator 250, using the true ground as its reference voltage, integrates the phase lock loop error voltage at 248 until the entire loop has adjusted itself to cause the CVO output frequency to be equal to and in phase with the reference frequency. When this has occurred, the loop error has been driven to zero volts or virtual ground, and the level of the integrator output 252 has stabilized at some constant level. That is, the dynamic or integrating action of the integrator is completed when the two integrator inputs are of equal value.

The signal from the sample and hold circuit 254 is transmitted on conductor 58, and through feedback resistor 260, to the conductor 194. The input to the instrument amplifier 200 is accordingly a combination of the output from the transducer 190 and the output from the integrator 250.

The conductor 224, which extends from the gain controlled amplifier 220, is also connected to a conductor 216. The conductor 216 extends from the conductor 224 to a reostat 286. A conductor 268 extends from the conductor 216 to a second integrator 270. the integrator 270, like the integrator 250, uses ground on conductor 271 voltage to control its integrating action.

The integrated signal from the integrator 270 is in turn transmitted to a second sample and hold circuit 274 by a conductor 272. Like the sample and hold circuit 254, the sample and hold circuit 274 receives its input control signal from the processor. The input signal from the processor to the sample and hold circuit 274 is by a conductor 276. From the sample and hold circuit 274, the conductor 278 extends to a summing amplifier 280.

A second input to the summing amplifier 280 is on a conductor 288 from the reostat 286. Part of the signal flowing through the conductor 216 is taken from the reostat 286 and transmitted to the summing amplifier 280. The reostat 286 is preadjusted at the factory to provide the correct signal level from the reostat 286 to the summing amplifier 280. This is part of the linearization process of the voltage controlled amplifier.

From the summing amplifier 260, the signal is transmitted on a conductor 282 and through a resistor 284 to a voltage sensitive capacitance 290. The voltage sensitive capacitance 290 is connected to the VCO by a conductor 292 and is used to help tune or control the frequency of the VCO. The negative regulated voltage is used as a reference voltage for the voltage sensitive capacitance 290. The voltage sensitive capacitance is also used to linearize the VCO 230, as will be discussed below.

The voltage sensitive capacitance 290 acts in two separate ways, or serves two functions. During the sample or circuit initializing period, the voltage sensitive capacitance serves to operate the phase lock loop to create a zero volts condition at the voltage port of the VCO 230, thereby centering the VCO voltage input between the extremes of its linear operating range. The net result is to maximize the linear operating range of the VCO.

During the hold period, both integrators hold the levels established during the sample period.

During the hold period, the voltage sensitive capacitance performs an additional function. It linearizes the VCO by retuning the operating range of the VCO. This is accomplished by applying a preset portion of the amplified differential pressure transducer output from the potentiometer 286 on the voltage sensitive capacitance.

The voltage sensitive capacitance is connected to the capacitive sensitive input port of the VCO by conductor 292.

A variable resistor 294 is also used to help tune or control the frequency of the voltage controlled oscillator. From the variable resistor 294, a conductor 296 extends to the VCO 230. The variable resistor 294 is factory preset under controlled conditions to provide a desired voltage bias on the voltage sensitive capacitance 290 to an optimum value, which is in the center of its optimum operating range. The adjustment is made with the phase lock loop in its sample or closed mode, so that there is interaction among all of the circuit elements, and with zero pressure on the transducer 190.

The resistor 294 is connected to the resistance sensitive port of the VCO 230 by the conductor 296.

Battery voltage is required for the sample and hold circuits 254 and 274, the operational integrators 250 and 270, the summing amplifier 280, and the amplifiers 200 and 220. The conductors for the battery voltage have been omitted for clarity. However, it will be noted that there are conductors shown in FIG. 7 extending from the battery 302 for providing battery voltage, just as there is also shown a center tapped ground from the battery. Conduccutors are also shown in FIG. 7 extending from the voltage regulator 304 for providing regulated voltage to the differential pressure transducer 190, the voltage controlled oscillator 230, and the voltage sensitive capacitance 290. The voltage sensitive capacitance 290 is a varactor diode.

During the sample time portion, a phase lock loop is used to compensate for dc offset produced by the differential pressure transducer 190 and the instrument amplifier 200. The phase lock loop includes the amplifier 200, the integrator 270, the sample and hold circuit 274, the summing amplifier 280, the voltage control oscillator, phase comparator 240, the low pass filter 246, the integrator 250, the sample and hold circuit 254, the voltage sensitive capacitance 290, and the analog selector switch 210.

In addition to compensating or removing the dc offset from the circuitry, the phase lock loop also causes the VCO 230 to have the null pressure operating frequency controlled to the same specifically designed or predetermined value. The benefit of a constant, specific zero signal operating frequency for the voltage control oscillator is that it prevents the voltage control oscillator from drifting to frequencies that may cause errors in the accurate measurement of output frequencies of the voltage control oscillator during the measurement of the differential pressure. Also, another benefit of the phase lock loop is the normalization of the voltage controlled oscillator center frequency operating point, which facilitates the linearization process for the voltage control oscillator, briefly referred to above.

As will be apparent from the review of the circuitry of FIG. 6, there are two time periods of interest. The first time period is a sample time period in which a number of functions are taking place. The second time period is a hold period in which the measurement of the sampled air pressure takes place.

During the first, or sample, time period, a zero reference pressure is established across the differential pressure transducer 190. That is, the frequency output of the VCO 230 is driven to be equal to the reference frequency from the processor 300. The reference frequency is transmitted to the phase comparator 240 by conductor 242 from the processor block 300.

Inherent and associated with the differential pressure transducer 190 and the instrument amplifier 200 and the gain control amplifier 220 are objectionable spurious offset voltages. These spurious offset voltages, if not compensated for, cause erroneous readings to be made. In actuality, such offset may prevent a measurement from being made. This is particularly true since the pressure differentials being measured may be very small, and thus the output voltage from the differential pressure transducer 190 is relatively small compared to the offset voltages.

With the solenoids 164 and 184 in their normally off or closed conditions, static pressure is applied to both sides of the differential pressure transducer 190 during this sample time period. With zero pressure across the differential pressure transducer 190, an output signal containing the spurious offset voltage is transmitted on conductors 192 and 194 to the instrument amplifier 220, where the signal is amplified and the amplified signal is transmitted to the gain controlled amplifier 220 or conductor 214 for additional amplification.

The amplified signal is then transmitted on conductor 224 to the VCO 230. The frequency output from the VCO 230 is transmitted on conductor 232 to the processor 300 and on conductor 234 to the phase comparator 240.

The phase comparator 240 compares the frequency of the VCO output on conductor 234 with the reference frequency input on conductor 242. Any phase difference between the two frequencies results in a loop error voltage output on conductor 244 to the low pass filter 246. A filtered dc output signal is transmitted from the low pass filter 246 to the operational integrator 250 on conductor 248. Any phase difference results in an output voltage other than zero volts. If the frequencies are identical, and are in phase, then a zero error voltage, or apparent ground, output is provided to the integrator 250.

The operational integrator 250, using the true ground as its reference voltage, integrates the phase lock loop error voltage on conductor 248 until the entire loop has adjusted itself to cause VCO output frequency to be equal to and in phase with the reference frequency. When this has occurred, the loop error has been driven to be zero volts, or virtual ground, and the level of the integrator output 252 has stabilized at some constant level. That is, the dymanics or integrating action of the integrator 250 is completed when the two integrator inputs are of equal value.

The output voltage of the integrator 250 is then transmitted unimpaired through the sample and hold circuitry 254 and through the resistor 260 to the conductor 194 where it is summed with the output signal from the differential pressure transducer 190 to effectively counterbalance the offset signal. That is, the voltage impressed upon the signal from the differential pressure transducer is of an equal and opposite magnitude to provide an effective zero output from the differential pressure transducer 190 and also from the amplifiers 200 and 220.

It will be noted that the output frequency of the VCO 230 on conductors 232 and 234 is responsive to not only a signal generated by the differential pressure transducer 190, but also to any additional offset signal generated by the amplifiers 200 and 220. The phase lock loop counterbalances the offset in the circuitry, and provides that the output from the voltage control oscillator on conductor 232 is substantially identical in phase with the reference frequency on conductor 242 to the phase comparator 240.

Also occurring during the first, or sample, time period is the establishing or initializing of the desired zero input voltage to the VCO 230. This is accomplished by the integrator 270, the sample and hold circuit 274, the summing amplifier 280, and the voltage sensitive capacitance 290, in conjunction with the reostat 286 and the variable resistor 294.

The amplified signal on conductor 224 is transmitted on conductor 216 to the reostat 286 and to the integrator 270 on conductor 268. The integrator 270, also using ground as a reference voltage, drives the capacitance level of the voltage sensitive capacitance 290 to provide zero voltage input to the VCO 230 on conductor 292.

The second time period, the hold period, begins after the completion of the sample time period. Several events occur during this time period, all under the control of the processor block 300.

The level of offset compensation established during the sample time period is held in memory throughout the second time period.

Two pressure differential measurements are made for gain ranging. These first two measurements comprise a "ping" and a "pong" or a pair of pressure reversed readings. That is, as described above, the solenoids 164 and 184 are alternately actuated to reverse the pressures across the differential pressure transducer 190. A "ping" is a reading taken when the solenoid 164 is actuated, and a "pong" is a reading taken when the solenoid 184 is actuated. These two readings are made for the purpose of providing input to the processor 300 to select the appropriate gain values for the amplifiers 200 and 220.

With the gain of the amplifiers 200 and 220 in their lowest range, the VCO output frequency is transmitted to the processor 300. If the gain is not sufficient, the processor increases the gain to a desired level. When the correct gain range is established, then the actual pressure measurement is performed.

However, one more step is performed prior to the actual pressure measurement. A zero pressure differential reading is made, with static pressure on both sides of the differential pressure transducer 190. This reading is made to establish a drift base line. After actual pressure readings are made, another zero pressure differential reading is taken to establish a final drift rate. The drift rate information is used to correct the actual pressure measurements.

The term "drift" refers to analog drive, or to intra-instrument or intra-component changes due to, temperature, leakage of capacitors, and the like. The smaller the pressure differential measurements, the greater the effect of the drift. That is, the lower the output voltage from the differential pressure transducer 190, the greater the effect of the drift. It is assumed that the drift is linear during the time period between the zero readings, or while the actual pressure sensing is being accomplished.

It will be noted that the voltage offset discussed above may be a part of drift. If the offset is fixed, then it is not contributing the drift. However, if the offset is changing, then it is contributing to the drift. While the phase lock loop discussed above is used to correct for offset, the drift correction is made in accordance with measurements correlated to information pre-programmed in the processor.

After the first drift rate reading is made, the actual pressure measurements are made. The actual pressure measurements comprise a plurality of successive ping-pong readings taken over a period of time. The output signals from the differential pressure transducer are appropriately corrected or compensated for, the spurious offset voltages, as determined during the sample (first) time period. The sample and hold circuits 254 and 274 hold the level they attained during the sample time period, and their levels are appropriately used during the hold period.

A preset portion of the amplified transducer output is provided during this time period from the rheostat 286 to the voltage sensitive capacitance 290. This voltage is used to linearize the output frequency versus input voltage response of the VCO 230, as discussed above.

Since the output of the VCO 290 is a frequency, the processor 300 "counts" the frequency output in response to each measurement, or each ping and each pong. Since several measurements are made, the counts are stored during the measuring period and are added together. The total counts are then divided by the number of separate measurements or readings, which is the total number of pings and pongs, to establish the actual pressure differential.

That pressure differential is then corrected for drift. After the desired number of pressure differential readings have been made, a second zero reading is made, as discussed above. The difference between the two drift readings establishes a drift rate for the time period during which the readings were made. A correction or compensation for the drift is applied to the result of the pressure measurement. The resultant value is the true pressure value, since the effect of the average drift rate is substracted out.

The actual desired information, in terms of airflow or air velocity, is determined by taking a plurality of sample pressure differential measurements over a period of time. The counts for each sample are added together and divided by the number of measurements, taken during the time period. This results in enhanced measurement resolution.

VELOCITY AIR PRESSURE SAMPLING DEVICES

Figure 8:
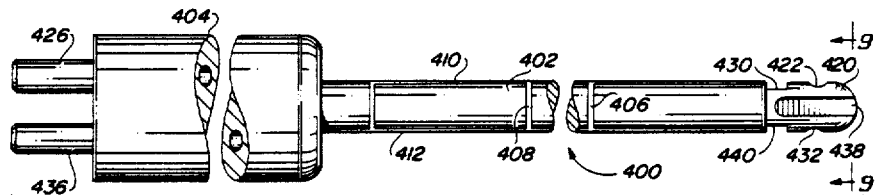
FIG. 8 is a side view, partially broken away, of another portion of the apparatus of the present invention.

FIG. 8 is a side view of an elongated probe-type air pressure sampling apparatus 400 which may be used in place of the manifold 34 with the meter housing 70. The meter housing 70 may be removed from the base 20, and a pair of tubes such as the tubes 36 and 38, except substantially longer, may be connected to the probe apparatus 400. The probe apparatus 400 is sometimes referrred to as a velprobe air sampling device.

FIG. 9 is an end view of the probe apparatus 400 taken generally along line 9—9 of FIG. 8. It comprises a front elevational view of the probe apparatus 400.

FIG. 10 is a view in partial section taken generally along line 10—10 of FIG. 9. It comprises a side view in partial section of the probe device 400. For the following discussion, reference will be primarily made to FIGS. 8, 9, and 10.

The elongated probe apparatus 400 includes a housing or wand or rod 402 connected to a handle 404. The housing or wand or rod 402 is relatively small in diameter in comparison to the diameter of the handle 404. The handle 404 is of a size, both in length and in diameter, as to be comfortable to a user of the apparatus.

On the exterior of the handle 404 is a plurality of spaced-apart bands. Two of the bands, a band 406 and a band 408 are shown in FIG. 7. The bands, such as the bands 406 and 408, extend circumferentially about the wand or rod 402. The bands are preferably spaced apart a predetermined distance, such as one inch. The bands are situated along the entire length of the wand or rod 402 to enable a user of the apparatus to make relatively accurate positioning of the wand. For example, if a plurality of readings are to be taken within a duct, the wand 402 may be extended through a relatively small diameter opening in the duct a first predetermined distance, then a second predetermined distance, etc., with the distances based on the spacing between the bands.

It will be understood that the size of the air pressure sampling apparatus 400 illustrated in the drawings is greatly exaggerated. In actuality, the diameter of the wand portion is about 5/16 of an inch (0.85 centimeters), and the diameter of the handle 404 is about one inch (2.5 centimeters). The length of the wand is preferably about 18½ inches (47 centimeters), and the length of the handle 404 is preferably about 2¾ inches (70 centimeters). Obviously, any length and diameter may be utilized, as practical, in accordance with the desires of the user.

At the distal end of the rod 402, remote from the handle 404, is a tip 420. The tip 420 includes a pair of ports, including an upper port 422 and a bottom port 432. The ports are aligned vertically with each other, as best shown in FIG. 9.

The ports 422 and 432 communicate respectively with a pair of tubes or bores 424 and 434. The bores or tubes 424 and 434 extend rearwardly from the tip 420 through the housing or wand or rod 402 and to and through the handle 404. The tubes or bores 424 and 434 then extend to a pair of port bosses, including, respectively, an upper port boss 426 and a lower port boss 436.

The port bosses 426 and 436 extend rearwardly from the handle 404 and are in turn connected to hoses or tubes, such as the tubes 36 and 38, which connect the probe apparatus 400 with the conduits of the differential pressure transducer 150.

A pair of slots 428 and 438, best shown in FIGS. 8 and 9, extend rearwardly along the side of the tip 420. The slots extend radially inwardly along the tip and extend rearwardly generally parallel to the longitudinal axis of the tip and the wand or rod 400. The slots 428 and 438 are symmetrical with each other and are disposed symmetrically with respect to the ports 422 and 432, as best shown in FIGS. 8 and 9. The slots 428 and 438 are accordingly disposed substantially half-way, or between, the ports 422 and 432.

The purpose of the slots 428 and 438 is to cause a controlled separation of the boundary layer of air flowing over the tip 420. As the manifold apparatus 400 is disposed in an air stream, the ports 422 and 432 will be aligned generally parallel to the flow of air. The slots 428 and 438 accordingly will be generally perpendicular or normal to the flow of air. The air flowing over the tip 402 includes a boundary layer adjacent to the tip 420. The controlled separation of the boundary layer insures a consistant velocity generated pressure differential relationship over a wide range of operating velocities. The upstream port 422 senses the total pressure of the airflow, while the downstream port 432 senses the static pressure.

It will be noted that the tip 420 is substantially symmetrical in all respects. That is, the ports 422 and 432 are disposed generally 180 degrees apart, and the slots or recesses 428 and 438 are also disposed substantially 180 degrees apart, and they are equally spaced between the ports 422 and 432. Accordingly, the probe 400 is generally symmetrical, and it makes no difference which way the probe is oriented in an airflow. That is, either port 422 or 432 may be considered as the upper or total pressure port, while the other port may be designated as the downstream or static pressure port.

The slots 428 and 438 are used to control the separation of the boundary layer of air about the tip so as to prevent inaccuracies in the reading of the static pressure through the downstream port. Such inaccuracies could occur if the boundary layer separation is not controlled.

Rearwardly of the ports 422 and 432, and adjacent to the juncture of the rod 402 with the tip 420, are a pair of laterally extending slots 430 and 440. The slots extend substantially perpendicular to the longitudinal axis of the rod 402 and are spaced apart slightly a relatively short distance rearwardly from the ports 422 and 432.

The slots 430 and 440 control the boundary layer separation of any airflow longitudinally of, or along, the rod 402. This interrupts and modifies any axial airflow across the ports 422 and 432 to minimize the effects of the axial airflow.

Figure 11:
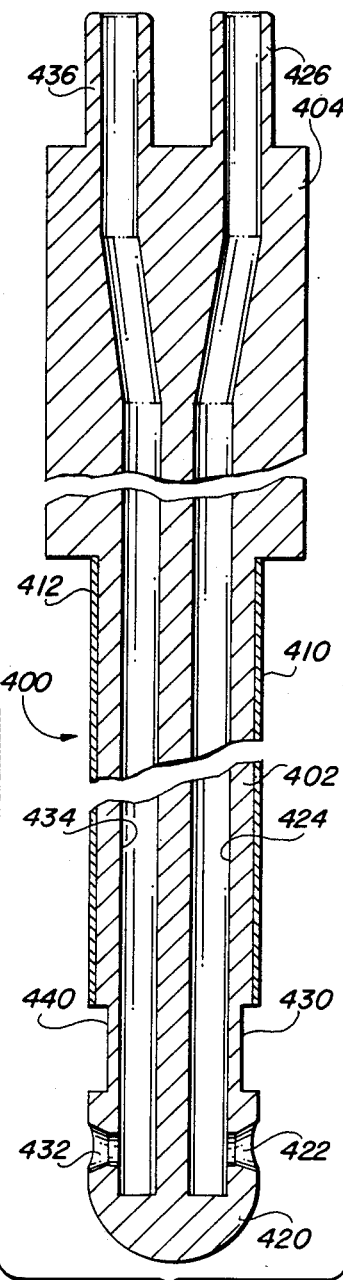
FIG. 11 is a side view, partially broken away, of an alternate embodiment of FIGS. 8, 9, and 10.
Figure 18:
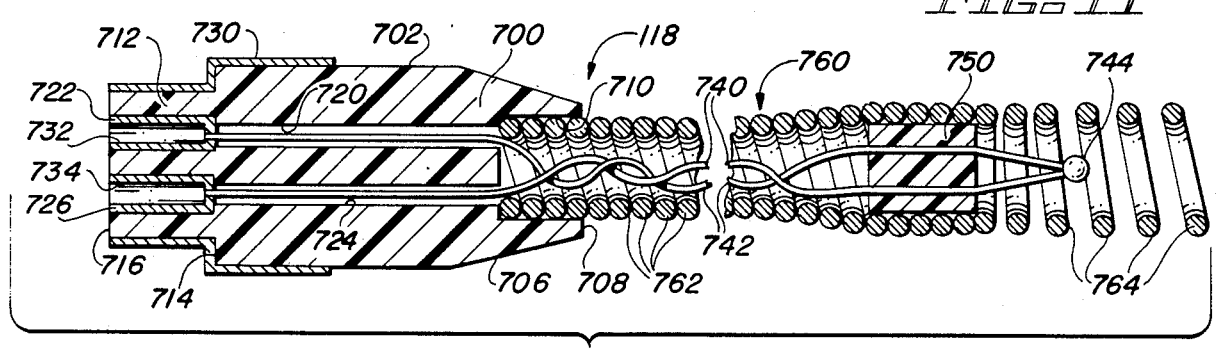
Figure 12:
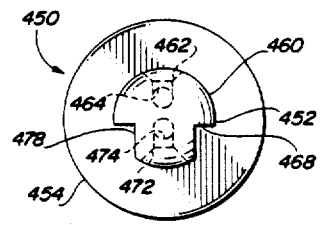
FIG. 12 is a front view of the apparatus of FIG. 11, taken generally along line 12—12 of FIG. 11.
Figure 11:
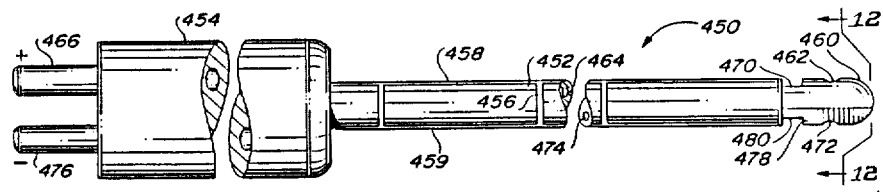

An alternate embodiment of the manifold apparatus 400 is illustrated in FIGS. 11 and 12. FIG. 11 is a side view of a probe manifold 450. The manifold 450 includes a rod or wand or housing 452, which is substantially identical to the wand or housing or rod portion 402 of the probe manifold 400. The wand or rod 452 also includes a handle 454. The handle 454 is connected to one end of the housing or wand or rod 452, and a tip 460 is secured to the distal end of the wand or rod 452 remote from the handle 454. A plurality of spaced apart bands extend circumferentially around the wand or rod 452. One such band, a band 456, is shown in FIG. 11. The bands are, obviously, for substantially the same purpose as the bands, such as the bands 406 and 408, of the probe manifold 400. That is, they are spaced apart predetermined distances, such as one inch, etc., so that the specific lengths or distances of the tip away from a predetermined location, such as a conduit wall, may be determined.

FIG. 12 is a front view of the probe manifold 450, taken generally along line 12—12 of FIG. 11. It comprises a front elevational view of the probe 50 at the tip 460. For the following discussion, reference will be made to both FIGS. 11 and 12.

A pair of ports 462 and 472 are shown in FIGS. 11 and 12. The ports 462 and 472 are substantially 180 degrees apart. The port 462 is the upstream or total pressure port, and the port 472 is the downstream or static pressure port. The ports 462 and 472 communicate with a pair of axially extending tubes or bores 464 and 474, respectively, which extend through the wand or rod 452. The bores or tubes 464 and 474 are shown in phantom in FIG. 12.

The tubes or bores 464 and 474 extend axially through the wand or rod 452 and to and through the handle 454 to communicate respectively with the pair of port bosses 466 and 476. In FIG. 11, the port or bore 466 is labeled with a "plus" and the port boss 476 is labeled with a "minus" sign. The port 466 will always be the upstream or velocity pressure port, and the port 476 will always be the downstream or static port due to the configuration of a pair of boundary layer separation slots.

The pair of boundary layer separation slots, including a slot 468 and a slot 478 are shown in FIG. 12. The slot 478 is also shown in FIG. 11. The slots 468 and 478 extend inwardly into the tip 460, but they are not symmetrical. The slots 468 and 478 are equally spaced from the downstream or static port 472, and they are respectively also equally spaced apart from the upstream or velocity pressure port 462. However, the slots 468 and 478 are not spaced equally distant apart. That is, they are both at the same radial distance from the upstream port, and they are also equally spaced from the downstream port 472. However, they are not equi-distance between the two ports. Obviously, as may be seen in FIGS. 11 and 12, the slots 268 and 478 are much closer to the downstream port 472 than they are to the upstream port 462.

The slots 468 and 478 also control the separation of the boundary layer of the air flowing over the tip 460. However, the controlled separation of the boundary layer places the boundary air much closer to the downstream port 472 than it does to the upstream port 462. The probe manifold 450 accordingly is not symmetrical. Rather, it is "polarized" in that the port 462 should always be the upstream or total pressure port, and the port 472 should always be the downstream or static pressure port. This necessitates the labeling of the port bosses 466 and 476 with a plus sign and a minus sign, respectively.

Both the probe apparatus 400 and the probe apparatus 450 may include longitudinally extending lines aligned with the ports on the tip to insure that the manifolds are aligned properly with respect to the flow of air in a duct, etc. Thus, in addition to the spaced-apart circumferentially extending bands, a pair of longitudinally or axially extending lines may also be incorporated into the apparatus. A top line 410 and a bottom line 412 are shown extending axially along the probe apparatus 400 in FIG. 8. A top line 458 and a bottom line 459 are shown extending axially along the probe apparatus 450 in FIG. 11.

Rearwardly of the ports 462 and 472, and disposed at the juncture of the rod 452 and the tip 460, are a pair of laterally extending slots 470 and 480. The slots 470 and 480 extend transversely or perpendicularly to the longitudinal axis of the rod or wand 452 and the tip 460. The slots 462 and 472 are spaced apart one hundred eighty degrees from each other, and are accordingly symmetrical with respect to the knobs 460 and to the ports 462 and 472 and the slots 468 and 478.

The slots 470 and 480 insure that there is a separation of any air which may flow axially with respect to the rod 452 so that the pressure sensed through the ports 462 is not adversely affected by an axial flow of air. The slots 470 and 480 act in substantially the same manner as do the slots 430 and 440 of the apparatus 400. They control the boundary layer separation of any longitudinal airflow along the rod 402 to interrupt or modify any such longitudinal or axial airflow across the ports or orifices 422 and 432 in order to emphasize the effects of such axial airflow.

Referring to FIGS. 9 and 12, in particular, it will be noted that the placement of the ports or orifices 422, 432 and 462, 472 may provide a gain control function in the pressure differential sensing. By locating the pressure sensing ports or orifices 422 and 432, and the ports or orifices 462 and 742 at other than one hundred eighty degrees apart, respectively, there is a ration or gain provided in the differential pressure sensed. Thus, the appropriate angular relationship between the sensing orifices or ports may provide a two or three, etc. gain ratio between the sensed pressures.

Figure 13:
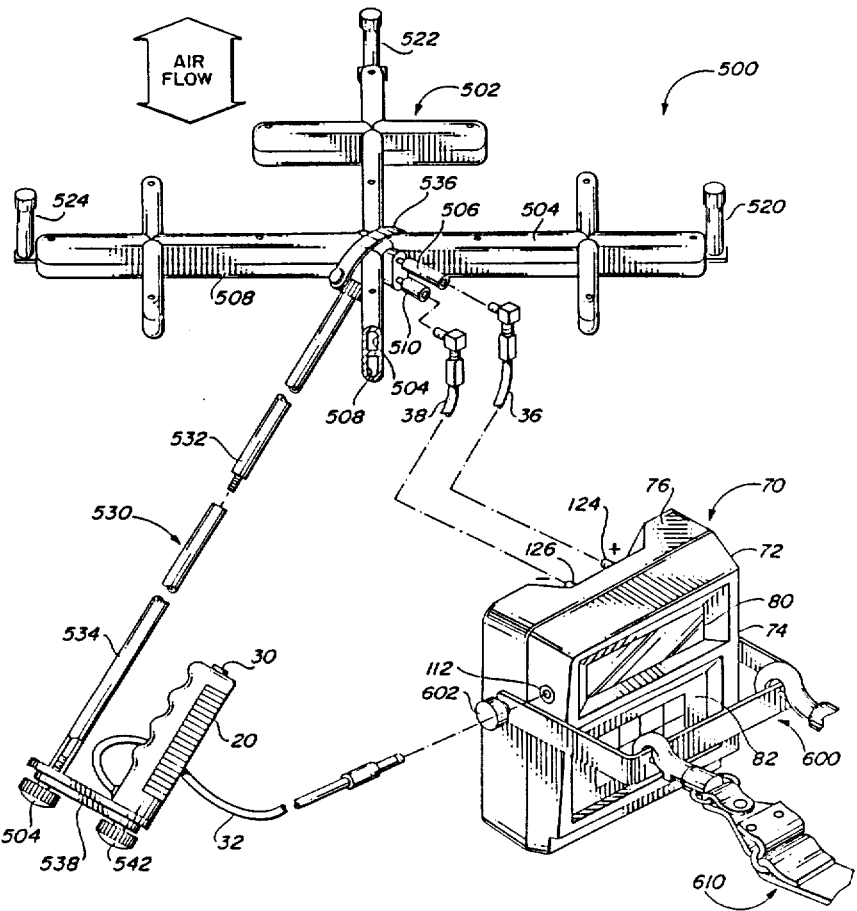
FIG. 13 is a perspective view of another portion of the apparatus of the present invention.

FIG. 13 is a perspective view of a "velgrid" pressure sampling device 500 usable with the meter 70 of the present invention. The velgrid pressure sensing device 500 includes a manifold grid 502 which is substantially identical to the manifold grid 34, discussed above in conjunction with the flow measuring apparatus 10. The manifold grid 502 includes four standoff feet secured to the distal ends fo the four arms of the manifold grid. The standoff feet include a foot 520, a foot 522, and a foot 524, all of which are illustrated in FIG. 13. The fourth foot is not shown. The feet are used for spacing the manifold grid 502 at a predetermined distance from the face of a filter, or the like. Also, the use of the standoff feet insures that the grid apparatus 502 is aligned substantially perpendicular to the flow of air from the filter when all of the feet are disposed against a filter.

A handle 530 is shown secured to the manifold grid 502 by a harness 536. The harness 536 is disposed at the juncture of the four arms of the grid 502. The handle includes two portions, a rod portion 532 and a rod portion 534. A threaded connection secures the rod portions together. The harness 536 is secured to the rod portion 534. The handle 28 is secured to the rod portion 534 by means of an adapter plate 538, and a pair of screws 540 and 542. The screw 540 is used to secure the plate 538 to the rod portion 534, and the screw 542 is sued to secure the handle 28 to the plate 538. The screw 542 may also be used to secure the handle 28 to the bracket plate 26, shown in FIGS. 1 and 2.

By removing the meter 70 from the base 20, the meter 70 may be used with either the velprobe apparatus 400 illustrated in FIGS. 8, 9 and 10, the velprobe apparatus 450 illustrated in FIGS. 11 and 12, or with the velgrid apparatus 500 illustrated in FIG. 13. With the velgrid apparatus 500, the handle 28 may be secured to the elongated handle 530, which is in turn secured to the velgrid manifold 502 so that a user may refer to the meter by holding the meter in one hand, and may, with the other hand, hold the handle 28 and thus position the velgrid manifold 502 as desired. By actuating the thumb switch 30, the meter 70 may be signaled to take a reading. A number of readings may be thus taken, without resorting to actuating the read switch 90 on the function switch panel 82. Obviously, to utilize the handle 28 and its read thumb switch 30, the cable 32, or actually a longer cable extension, must be appropriately connected to the external read jack 112.

The manifold grid 504 includes two manifold portions, an upper or total pressure manifold 502 and a lower or static pressure manifold portion 508. The upper manifold portion 504 includes a port 506 which is connected to the positive pressure port 124 by the tubing or hose or conduit 36. The lower or static manifold pressure portion 508 includes a port 510 which is appropriately secured to the hose or tubing or conduit 38. The conduit or hose 38 in turn extends to the negative or static pressure port 126 of the meter 70. This is, of course, substantially the same arrangement as illustrated above in conjunction with FIGS. 2 and 6 and as discussed also in conjunction with FIGS. 8, 9, 10, 11, and 12.

A U-shaped handle 600 is shown secured to the meter 70. The handle is screwed to the meter 70 by a pair of screws, of which a screw 602 is shown in FIG. 13. The handle 600 is movable or positionable with respect to the meter 70, and accordingly the meter may be used to stand alone, by using the handle 600 as a foot, or, as illustrated in FIG. 13, the handle 600 may be used to secure the meter 70 to a user by means of a harness 610. The harness 610 includes a neck strap which is appropriately secured to the handle 600, as by a pair of snap fasteners, etc. The harness 610 is, of course removable so that the meter may be used without the harness, or as desired.

As discussed above, the velprobe embodiments 400 and 450 and the velgrid embodiment 500 are pressure sampling devices used to provide air velocity information. Since there is no controlled or known area with which the velprobe and velgrid embodiments are used, volume airflow may not be directly measured by the meter when using them as air sampling devices. However, the volume airflow can be calculated by multiplying the average velocity by the measured area.

The velprobe embodiments include only a single pair of sampling ports, and accordingly a single location is sampled at any one time. With the velgrid apparatus 500, a plurality of sampling ports are contained in the grid apparatus, and accordingly airflow samples are taken over a relatively large area and are appropriately averaged in the respective upper and lower manifold portions. The pressure differential sensed between the upper manifold grid portion and the lower manifold grid portion accordingly comprises an average pressure over a much greater area than can be sampled at any one time by either the velprobe apparatus 400 or the velprobe apparatus 450.

TEMPERATURE PROBE

Figure 14:
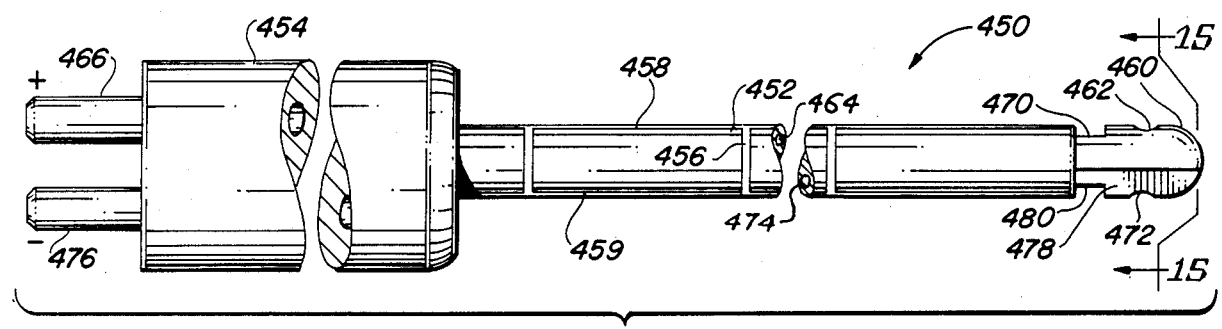
FIG. 14 is a side view in partial section, and partially broken away, of another portion of the apparatus of the present invention.
Figure 16:
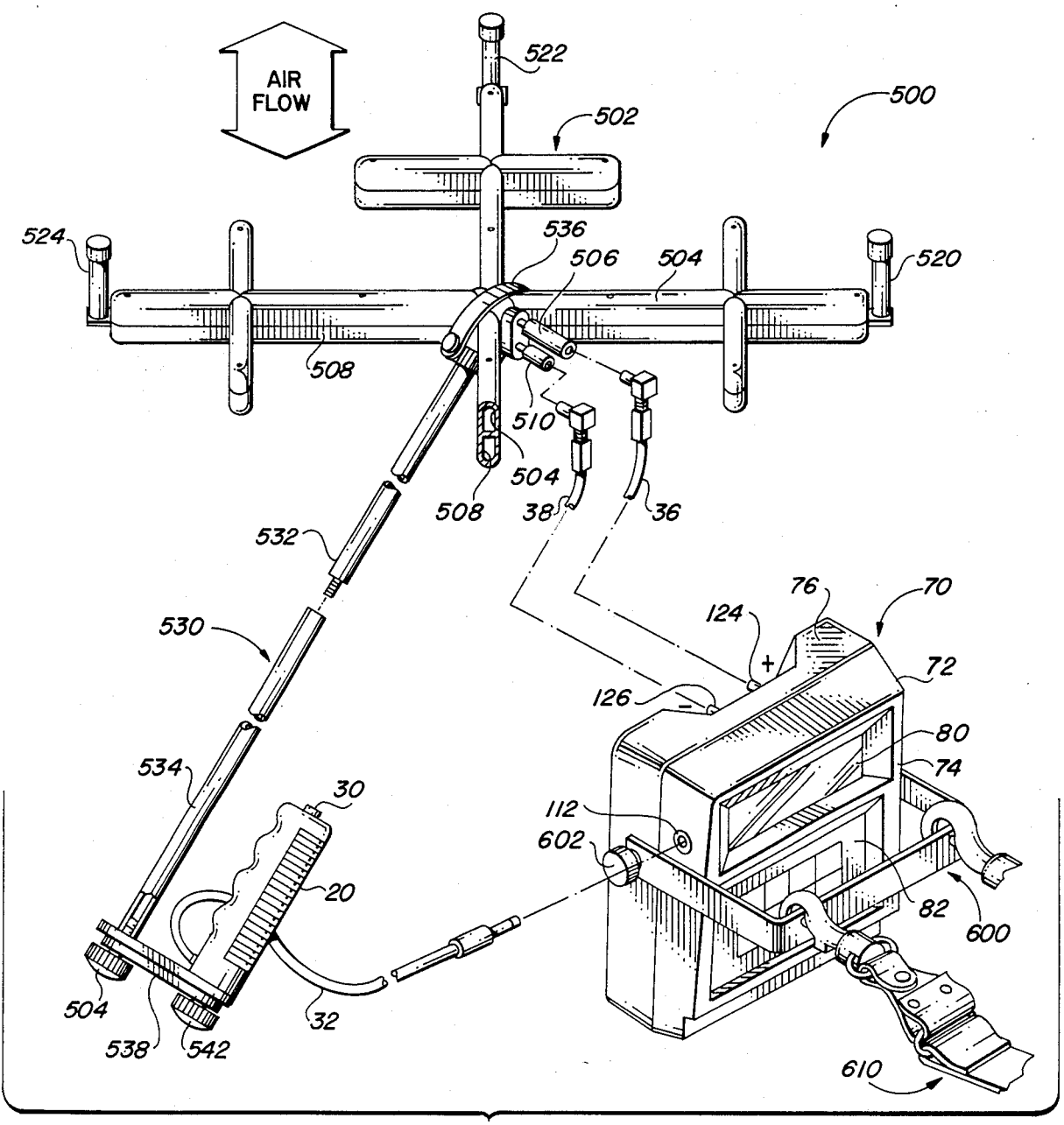

FIG. 14 is a longitudinal side view in partial section of temperature probe 118. The temperautre probe 118 includes a dielectric base 700 which includes a primary portion 702, a front conical portion 706, and a reduced diameter cylindrical portion 712. The reduced diameter cylindrical portion 712 is at the rear of the base 700, remote from the conical portion 706. The conical portion 706 terminates in an end wall 708 which is substantially perpendicular to the longitudinal access of the base 700, and substantially perpendicular to the longitudinal access of the probe 118.

Extending rearwardly from the end wall 708 is a bore 710. The bore 710 is substantially coaxial with the base 700. Extending rearwardly from the bore 710, and through the base 700, is a pair of parallel bores, including a bore 720 and a bore 724. The bore 720 extends rearwardly and communicates with a bore 722 in the rear cylindrical portion 712. The bore 724 extends rearwardly and communicates with a bore 726, also disposed within the rear cylindrical portion 712.

A shoulder 714 extends between the rear cylindrical portion 712 and the primary cylindrical portion 702. The cylindrical portion 712 terminates in a rear end well 716 which is substantially perpendicular to the longitudinal axis of the temperature probe 118, and accordingly substantially parallel to the front end wall 708. The bores 722 and 726 extends to and through the end wall 716.

A conductive metal jacket 730 is disposed about the reduced diameter rear cylindrical portion 712, along the shoulder 714, and over a portion of the primary cylindrical portion 702 of the base 700. Disposed within the bores 722 and 726 are tubular conductive sockets 732 and 734. The sockets 732 and 734 terminate at the bores 720 and 724.

A pair of conductors 740 and 742 extend through the bores 720 and 724, respectively, and are appropriately electrically connected to the sockets 732 and 734. The conductors 740 and 742 extend outwardly from the base 700, through the interior of the bore 720, and ultimately extend to a temperature sensing element 744, which may be a thermistor, a thermocouple, etc. The element 744 is spaced apart from a dielectric bushing or block 750 through which the conductors 740 and 742 extend. The conductors 740 and 742 are, of course, appropriately insulated along their length.

A tension coil spring 760 is disposed about the conductors 740 and 742, about the dielectric bushing 750, and about the temperature sensing element 744. The tension coil spring 760 is disposed within the bore 710, and is appropriately secured therein.

The tension coil spring 760 includes a plurality of individual coils, including a plurality of coils 762 which are disposed adjacent to each other. Outwardly from the bushing 750, there are a plurality of spread apart coils 764. The coils 764 are spread apart to allow relaitvely unrestricted airflow through them and past the element 744.

The tightly wound or adjacent coils 762 hold the bushing 750 in place in a relatively fixed manner. It will be noted that the diameter of the coils 762 about the bushing 750 is slightly greater than the diameter of the coils 762 rearwardly of the bushing or block 750, or between the bushing 750 and the bore 710 and the base 700.

The tension coil spring 760 protects the conductors 740 and 742 and the element 744 from inadvertent damage due to incidental bumping, rough handling, etc., both when the probe 118 is secured to the meter 70 and within the base 20, as well as when the probe 118 is utilized as a free-standing element. In case of a jar, a bump, etc., the coils 762 of the spring 760 allow the probe to bend, as required, and yet maintain the conductors 740 and 742, and the element 744, intact.

In FIG. 2, the temperature probe 118 is illustrated as being secured directly to the rear of the meter 70, and FIG. 5 illustrates the jack 116 to which the temperature probe is secured. When the temperature probe 118 is used separately from the volume flow apparatus 10, the probe 118 may be appropriately connected to a wand or rod for remote temperature sensing, with appropriate conductors extending from the sockets 732 and 734 to the jack 116 at the meter 70. Thus, the use of the probe 118 is not limited to the direct connection with the meter 70. Rather, in order to compensate for, or to correct for, the density of the air, the temperature of the air being sampled must be utilized, and accordingly the temperature probe 118 should be disposed within the flow of air being sampled.

When the temperature probe 118 is secured to the jack 116 of the meter 70, and the meter is secured to the base 20, as is shown in FIG. 2, there is a hard, fixed, connection between the probe 118 and the meter 70. In case of an inadvertent knock, blow, etc., the spring 760 allows the probe to yield or bend with the applied force. Otherwise, either the probe or the meter would likely sustain damage. Moreover, the spread coils 764 allow airflow past the element 744 but at the same time provide substantial protection to the element.

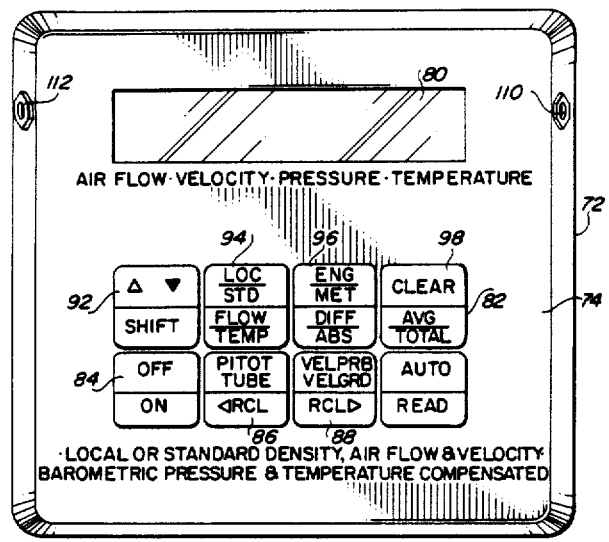
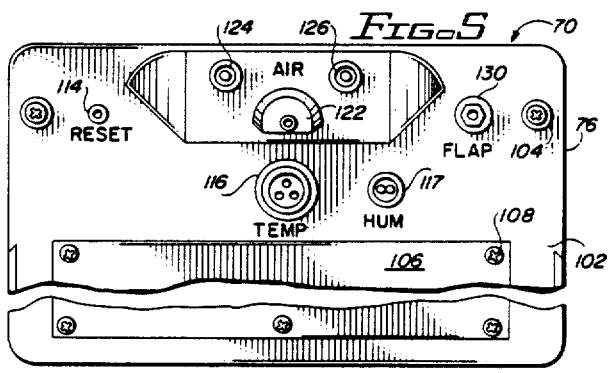
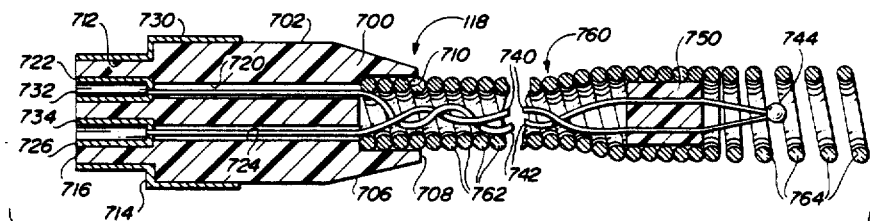

What we claim is:

1. Pressure measuring apparatus for determining flow, comprising, in combination:
   means for sampling air pressure, including means for sampling differential air pressure;
   means for providing an output signal in response to the sampled air pressure, and including a first offset portion in the output signal;
   means for amplifying the output signal, including the first offset portion, and for providing a second offset portion in the amplified output signal;
   means for compensating the amplified output signal for the first and second offset portions;
   means for providing an output in response to the compensated amplified output signal representing the differential air pressure sensed, including a voltage controlled oscillator having a desired operating range of voltage input with respect to frequency output; and
   means responsive to the compensated amplified output signal for linearizing the desired operating range of the voltage controlled oscillator to provide a linear relationship over an expanded voltage input range with respect to a frequency output representing the measured pressure.

2. The apparatus of claim 1 in which the means for providing an output further includes logic means for controlling the means for providing an output signal and the means for amplifying the output signal.

3. The apparatus of claim 2 in which the logic means includes means for providing a first time period and a second time period.

4. The apparatus of claim 3 in which the means for providing an output signal in response to the sampled differential air pressure includes a differential pressure transducer.

5. The apparatus of claim 4 in which the means for providing an output signal in response to the sampled differential air pressure further includes value means for controlling the sampled air pressure to the transducer.

6. The apparatus of claim 5 in which the means for providing an output signal in response to the sampled air pressure includes means for sampling static air pressure and means for sampling total air pressure.

7. The apparatus of claim 6 in which the valve means includes means for providing static air pressure to the differential pressure transducer to provide a zero pressure differential output signal during the first time period and during the second time period.

8. The apparatus of claim 7 in which the means for providing an output further includes means for providing a zero output signal to the voltage controlled oscillator during the first time period representing a zero pressure differential.

9. The apparatus of claim 8 in which the means for sampling air pressure further includes means for sensing absolute air pressure, and the logic means includes means for compensating the output signal representing differential air pressure for absolute pressure.

10. The apparatus of claim 9 in which the means for sampling air pressure further includes a base through which the sampled air flows and a manifold disposed within the base for providing airflow measurements.

11. The apparatus of claim 10 in which the means for sampling air pressure further includes means for compensating for back pressure due to the base.

12. The apparatus of claim 11 in which the means for compensating for back pressure includes flap means movable between a closed position normal to the flow of air through the base and an open position parallel to the flow of air.

13. The apparatus of claim 12 in which the means for sampling air pressure further includes means for sensing the temperature of the air for correcting the measured pressure differential for air density.

14. The apparatus of claim 9 in which the means for sampling air pressure includes velocity means for sensing differential pressure for determining air velocity.

15. The apparatus of claim 14 in which the velocity means includes probe means extendable into a flow of air.

16. The apparatus of claim 15 in which the probe means includes:
   a generally elongated wand having a first end and a second end;
   a tip at the first end;
   a first bore in the wand extending from the tip at the first end to the second end for communicating a first pressure;
   a second bore in the wand extending from the tip at the first end to the second end for communicating a second pressure;
   a first port at the first end communicating with the first bore for measuring total pressure of the airflow;
   a second port at the first end communicating with the second bore for measuring static pressure of the air flow; and
   means for controlling the separation of boundary layer air flow between the first and second ports.

17. The apparatus of claim 16 in which the means for controlling the separation of boundary layer air flow includes a pair of slots on the tip generally symmetrical with respect to each other and to the first and second ports.

18. The apparatus of claim 14 in which the velocity means includes manifold grid means for sampling air pressure from a plurality of locations.

19. The apparatus of claim 18 in which the manifold grid means includes:
   a manifold grid including
      a first manifold portion for sensing total pressure,
      a first port connected to the first manifold portion,
      a second manifold portion for sensing static pressure,
      a second port connected to the second manifold portion,
      a plurality of arms, each of which includes the first and second manifold portions,
      a plurality of standoff feet secured to the plurality of arms for spacing the manifold grid a predetermined distance from an object in an air flow to be measured and for insuring that the manifold grid is substantially perpendicular to the airflow to be measured, and
   means for connecting the first and second ports to the means for providing an output signal; and handle means for supporting the manifold grid means remote from the means for providing an output signal.

20. The apparatus of claim 19 in which the handle means includes a handle and a harness for securing the handle to the manifold grid.

21. The apparatus of claim 20 in which the handle means further includes switch means connected to the means for providing an output signal for sampling air pressure from the manifold grid.

* * * * *

UNITED STATES PATENT AND TRADEMARK OFFICE
CERTIFICATE OF CORRECTION

PATENT NO. : 4,754,651
DATED : July 5, 1988
INVENTOR(S) : ERNEST R. SHORTRIDGE

It is certified that error appears in the above-identified patent and that said Letters Patent is hereby corrected as shown below:

In Col. 5, line 11, "flps" should be -- flaps --.
In Col. 6, line 11, "speraking" should be -- speaking --.
In Col. 11, line 51, "drife" should be -- drift --.
In Col. 14, line 17, "CVO" should be -- VCO --.
In Col. 15, line 38, "Conduccutors" should be -- Conductors --.

The attached sheets of drawings, comprising sheets 3, 5, and 6, should be substituted for the corresponding sheets 3, 5, and 6 in the patent.

Signed and Sealed this

Fifteenth Day of August, 1989

Attest:

DONALD J. QUIGG

*Attesting Officer*  *Commissioner of Patents and Trademarks*